US012712616B2

(12) United States Patent
Tseng et al.

(10) Patent No.: US 12,712,616 B2
(45) Date of Patent: Aug. 18, 2026

(54) METHOD AND APPARATUS FOR NETWORK ENERGY SAVING IN WIRELESS NETWORKS

(71) Applicant: SHARP KABUSHIKI KAISHA, Sakai City (JP)

(72) Inventors: Tzu-Yueh Tseng, Taipei (TW); Yung-Lan Tseng, Taipei (TW); Po-Chun Chou, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 22 days.

(21) Appl. No.: 18/899,220

(22) Filed: Sep. 27, 2024

(65) Prior Publication Data

US 2025/0105900 A1 Mar. 27, 2025

Related U.S. Application Data

(60) Provisional application No. 63/585,706, filed on Sep. 27, 2023.

(51) Int. Cl.
*H04B 7/02* (2018.01)
*H04B 7/06* (2006.01)
*H04L 5/00* (2006.01)

(52) U.S. Cl.
CPC ......... *H04B 7/0626* (2013.01); *H04L 5/0048* (2013.01)

(58) Field of Classification Search
CPC ............................ H04B 7/0626; H04L 5/0048
USPC ................ 375/267, 260, 259, 219, 295, 316
See application file for complete search history.

(56) References Cited

U.S. PATENT DOCUMENTS

2025/0056279 A1* 2/2025 Ly ......................... H04L 5/0094
2025/0266879 A1* 8/2025 He ......................... H04L 1/1812

OTHER PUBLICATIONS

3rd Generation Partnership Project; Technical Specification Group Radio Access Network; NR; Multiplexing and channel coding (Release 17), 3GPP TS 38.212 V17.5.0 (Mar. 2023).
3rd Generation Partnership Project; Technical Specification Group Radio Access Network; NR; Physical layer procedures for control (Release 17), 3GPP TS 38.213 V17.6.0 (Jun. 2023).
3rd Generation Partnership Project; Technical Specification Group Radio Access Network; NR; Physical layer procedures for data (Release 17), 3GPP TS 38.214 V17.6.0 (Jun. 2023).

(Continued)

*Primary Examiner* — Zewdu A Kassa
(74) *Attorney, Agent, or Firm* — ScienBiziP, P.C.

(57) ABSTRACT

A method performed by a user equipment (UE) for network energy saving (NES) is provided. The method receives, from a base station (BS), a channel state information (CSI) report configuration including multiple sub-configurations associated with a triggering state, each of the multiple sub-configurations indicating a list of channel state information (CSI)-reference signal (RS) identifiers (IDs), first information for a spatial domain adaptation, and second information for a power domain adaptation. The method receives multiple CSI-RSs based on the list of CSI-RS IDs, the first information, and the second information indicated by each sub-configuration in a subset of the multiple sub-configurations. The method generates a CSI report by measuring the multiple CSI-RSs. The method then transmits, to the BS, the CSI report. The triggering state is associated with aperiodic CSI reporting or semi-persistent CSI reporting.

18 Claims, 7 Drawing Sheets

(56) References Cited

OTHER PUBLICATIONS

3rd Generation Partnership Project; Technical Specification Group Radio Access Network; NR; User Equipment (UE) radio access capabilities (Release 17), 3GPP TS 38.306 V17.5.0 (Jun. 2023).

3rd Generation Partnership Project; Technical Specification Group Radio Access Network; NR; Medium Access Control (MAC) protocol specification (Release 17), 3GPP TS 38.321 V17.5.0 (Jun. 2023).

* cited by examiner

METHOD AND APPARATUS FOR NETWORK ENERGY SAVING IN WIRELESS NETWORKS

CROSS-REFERENCE TO RELATED APPLICATION(S)

The present disclosure claims the benefit of and priority to U.S. Provisional Patent Application Ser. No. 63/585,706, filed on Sep. 27, 2023, entitled "REQUIREMENT OF SPATIAL AND POWER DOMAIN ADAPTATION FOR NETWORK ENERGY SAVINGS," the content of which is hereby incorporated herein fully by reference into the present disclosure for all purposes.

FIELD

The present disclosure is related to wireless communication and, more specifically, to a User Equipment (UE), Base Station (BS), and method for network energy saving (NES) in the wireless communication networks.

BACKGROUND

Various efforts have been made to improve different aspects of wireless communication for the cellular wireless communication systems, such as the 5$^{th}$ Generation (5G) New Radio (NR), by improving data rate, latency, reliability, and mobility. The 5G NR system is designed to provide flexibility and configurability to optimize network services and types, accommodating various use cases, such as enhanced Mobile Broadband (eMBB), massive Machine-Type Communication (mMTC), and Ultra-Reliable and Low-Latency Communication (URLLC). As the demand for radio access continues to increase, however, there exists a need for further improvements in the next-generation wireless communication systems.

SUMMARY

The present disclosure is related to a UE, a BS, and a method for network energy saving (NES) in the wireless communication networks.

In a first aspect of the present disclosure, a method performed by a UE for NES is provided. The method includes receiving, from a BS, a channel state information (CSI) report configuration including multiple sub-configurations associated with a triggering state, each sub-configuration in the multiple sub-configurations indicating a list of channel state information (CSI)-reference signal (RS) identifiers (IDs), first information for a spatial domain adaptation, and second information for a power domain adaptation; receiving multiple CSI-RSs based on the list of CSI-RS IDs, the first information, and the second information indicated by each sub-configuration in a subset of the multiple sub-configurations; generating a CSI report by measuring the multiple CSI-RSs; and transmitting, to the BS, the CSI report. The triggering state is associated with aperiodic CSI reporting or semi-persistent CSI reporting.

In some implementations of the first aspect, the CSI report includes at least one of a channel quality indicator (CQI), a precoding matrix indicator (PMI), a CSI-RS resource indicator (CRI), a synchronization signal/physical broadcast channel block resource indicator (SSBRI), a layer indicator (LI), a rank indicator (RI), and a layer 1 (L1)-reference signal received power (RSRP).

In some implementations of the first aspect, in a case that the triggering state is associated with the aperiodic CSI reporting, the subset of the multiple sub-configurations is activated and indicated based, respectively, on a medium access control (MAC) control element (CE) and downlink control information (DCI) received from the BS.

In some implementations of the first aspect, in a case that the triggering state is associated with the semi-persistent CSI reporting, the subset of the multiple sub-configurations is activated based on a MAC CE received from the BS.

In some implementations of the first aspect, the first information includes an antenna port configuration associated with the list of CSI-RS IDs.

In some implementations of the first aspect, the second information includes a power offset value associated with the list of CSI-RS IDs.

In a second aspect of the present disclosure, a UE for NES is provided. The UE includes at least one processor and at least one non-transitory computer-readable medium that is coupled to the at least one processor and that stores one or more computer-executable instructions. The computer-executable instructions, when executed by the at least one processor, cause the UE to: receive, from a BS, a CSI report configuration including multiple sub-configurations associated with a triggering state, each sub-configuration in the multiple sub-configurations indicating a list of CSI-RS IDs, first information for a spatial domain adaptation, and second information for a power domain adaptation; receive multiple CSI-RSs based on the list of CSI-RS IDs, the first information, and the second information indicated by each sub-configuration in a subset of the multiple sub-configurations; generate a CSI report by measuring the multiple CSI-RSs; and transmit, to the BS, the CSI report. The triggering state is associated with aperiodic CSI reporting or semi-persistent CSI reporting.

In a third aspect of the present disclosure, a BS for NES is provided. The BS includes at least one processor and at least one non-transitory computer-readable medium that is coupled to the at least one processor and that stores one or more computer-executable instructions. The computer-executable instructions, when executed by the at least one processor, cause the BS to: transmit, to a UE, a CSI report configuration including multiple sub-configurations associated with a triggering state, each sub-configuration in the multiple sub-configurations indicating a list of CSI-RS IDs, first information for a spatial domain adaptation, and second information for a power domain adaptation; transmit multiple CSI-RSs based on the list of CSI-RS IDs, the first information, and the second information indicated by each sub-configuration in a subset of the multiple sub-configurations; and receive, from the UE, a CSI report. The CSI report is generated by measuring the multiple CSI-RSs, and the triggering state is associated with aperiodic CSI reporting or semi-persistent CSI reporting.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DETAILED DESCRIPTION

Figure 1:
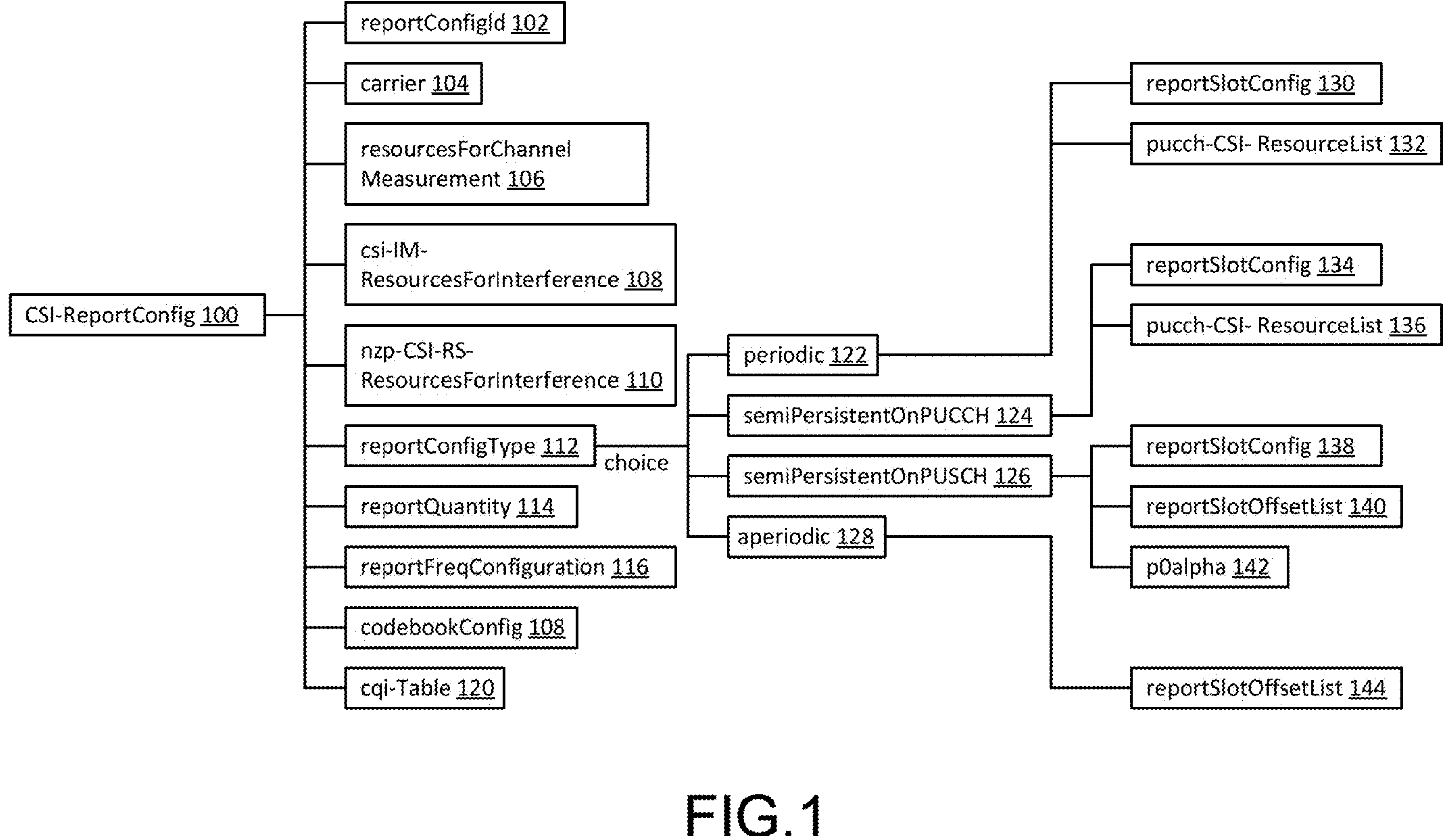
FIG. 1 is a schematic diagram illustrating a hierarchical structure of a CSI report configuration information element, according to an example implementation of the present disclosure.

Some of the abbreviations used in the present disclosure include:

| Abbreviation | Full name |
|---|---|
| 3GPP | 3rd Generation Partnership Project |
| 5G | 5th Generation |
| A-CSI | Aperiodic Channel State Information |
| ACK | Acknowledgment |
| BS | Base Station |
| BWP | Bandwidth Part |
| C-RNTI | Cell-Radio Network Temporary Identifier |
| CA | Carrier Aggregation |
| CB | Codebook-Based |
| CBRA | Contention-Based Random Access |
| CC | Component Carrier |
| CCE | Control Chanel Element |
| CE | Control Element |
| CFRA | Contention-Free Random Access |
| CG | Configured Grant |
| CHO | Conditional Handover |
| CORESET | Control resource set |
| CPE | Customer Premises Equipment |
| CPU | Channel State Information Processing Unit |
| CQI | Channel Quality Indicator |
| CR | Change Request |
| CRC | Cyclic Redundancy Check |
| CS-RNTI | Configured Scheduling-Radio Network Temporary Identifier |
| CSI | Channel State Information |
| CSI-IM | CSI-Interference Measurement |
| CSI-RS | Channel State Information-Reference Signal |
| CRI | CSI-RS resource Indicator |
| CSS | Common Search Space |
| DAPS | Dual Active Protocol Stack |
| DC | Dual Connectivity |
| DCI | Downlink Control Information |
| DL | Downlink |
| DMRS | Demodulation Reference Signal |
| E-UTRA | Evolved Universal Terrestrial Radio Access |
| FDD | Frequency Division Duplex |
| FDRA | Frequency Domain Resource Assignment |
| FR | Frequency Range |
| FR1 | Frequency Range 1 |
| FR2 | Frequency Range 2 |
| FTP | Full Power Transmission |
| FWA | Fixed Wireless Access |
| GC-PDCCH | Group Common-Physical Downlink Control Channel |

-continued

| Abbreviation | Full name |
|---|---|
| HARQ | Hybrid Automatic Repeat Request |
| HARQ-ACK | HARQ Acknowledgement |
| HO | Handover |
| ID | Identifier |
| IE | Information Element |
| IIoT | Industrial Internet of Things |
| IM | Interference Measurement |
| LI | Layer Indicator |
| LSB | Least Significant Bit |
| LTE | Long Term Evolution |
| LTM | Layer 1/Layer 2 Triggered Mobility |
| L1/L2/L3 | Layer 1/Layer 2/Layer 3 |
| L1-RSRP | L1-Reference Signal Received Power |
| L1-SINR | L1-Signal to Interference plus Noise Ratio |
| MAC | Medium Access Control |
| MAC CE | MAC Control Element |
| MCG | Master Cell Group |
| MCS | Modulation and Coding Scheme |
| MCS-C-RNTI | Modulation Coding Scheme-Cell-Radio Network Temporary Identifier |
| MIMO | Multi-input Multi-output |
| MSB | Most Significant Bit |
| multi-TRP | multiple Transmission and Reception Point |
| NACK | Negative Acknowledgment |
| NAS | Non-Access Stratum |
| NDI | New Data Indicator |
| NES | Network Energy Saving |
| NG-RAN | Next Generation RAN |
| Non-CB | non-Codebook-Based |
| NR | New Radio |
| NUL | Normal Uplink |
| NW | Network |
| NZP CSI-RS | Non-Zero Power CSI-RS |
| OFDM | Orthogonal Frequency Division Multiplexing |
| P-CSI | Periodic Channel State Information |
| P-MPR | Power management Maximum Power Reduction |
| PBCH | Physical Broadcast Channel |
| PCell | Primary Cell |
| PCI | Physical Cell Identifier |
| PD | Power Domain |
| PDCCH | Physical Downlink Control Channel |
| PDSCH | Physical Downlink Shared Channel |
| PDU | Protocol Data Unit |
| PH | Power Headroom |
| PHR | Power Headroom Report |
| PHY | Physical (layer) |
| PMI | Precoding Matrix Indicator |
| PRACH | Physical Random Access Channel |
| PRB | Physical Resource Block |
| PSCell | Primary Secondary Cell |
| PTAG | Primary Timing Advance Group |
| PTRS | Phase Tracking Reference Signal |
| PUCCH | Physical Uplink Control Channel |
| PUSCH | Physical Uplink Shared Channel |
| QCL | Quasi Co-Location |
| RA | Random Access |
| RACH | Random Access Channel |
| RAN | Radio Access Network |
| RAR | Random Access Response |
| Rel | Release |
| RI | Rank Indicator |
| RMSI | Remaining Minimum System Information |
| RNTI | Radio Network Temporary Identifier |
| RRC | Radio Resource Control |
| RS | Reference Signal |
| RSRP | Reference Signal Received Power |
| RSRQ | Reference Signal Received Quality |
| RSSI | Reference Signal Strength Indication |
| RV | Redundancy Version |
| SCell | Secondary Cell |
| SCG | Secondary Cell Group |
| SCS | Subcarrier Spacing |
| SD | Spatial Domain |
| SDM | Spatial Division Multiplexing |
| SFN | Single-Frequency Network |
| SINR | Signal to Interference plus Noise Ratio |

-continued

| Abbreviation | Full name |
|---|---|
| SpCell | Special Cell |
| SP-CSI | Semi-Persistent Channel State Information |
| SR | Scheduling Request |
| SRS | Sounding Reference Signal |
| SRI | SRS Resource Indicator |
| SSB | Synchronization Signal Block |
| SSBRI | Synchronization Signal/Physical Broadcast Channel Block Resource Indicator |
| TA | Timing Advance |
| TAG | Timing Advance Group |
| TB | Transport Block |
| TBS | Transport Block Size |
| TCI | Transmission Configuration Indicator |
| TDM | Time Division Multiplexing |
| TDRA | Time Domain Resource Assignment |
| TPC | Transmission Power Control |
| TPMI | Transmit Precoder Matrix Indication |
| TR | Technical Report |
| TRI | Transmit Rank Indication |
| TS | Technical Specification |
| UE | User Equipment |
| UL | Uplink |
| URLLC | Ultra-Reliable and Low-Latency Communication |
| USS | UE-Specific Search Space |
| WCDMA | Wideband Code Division Multiple Access |
| WG | Working Group |
| WI | Working Item |
| ZP-CSI-RS | Zero power CSI-RS |

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may be different in other respects and may not be narrowly confined to what is illustrated in the drawings.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "In some implementations," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series, and the equivalent.

The expression "at least one of A, B and C" or "at least one of the following: A, B and C" means "only A, or only B, or only C, or any combination of A, B and C." The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details, such as functional entities, techniques, protocols, and standards, are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software, or a combination of software and hardware. Disclosed functions may correspond to modules which may be software, hardware, firmware, or any combination thereof.

A software implementation may include computer executable instructions stored on a computer-readable medium, such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Application-Specific Integrated Circuits (ASICs), programmable logic arrays, and/or one or more Digital Signal Processor (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface. Although the gNB is used as an example in some implementations within the present disclosure, it should be noted that the disclosed implementations may also be applied to other types of base stations.

The BS may be operable to provide radio coverage to a specific geographical area using multiple cells forming the RAN. The BS may support the operations of the cells. Each cell may be operable to provide services to at least one UE within its radio coverage.

Each cell (may often referred to as a serving cell) may provide services to one or more UEs within the cell's radio coverage, such that each cell schedules the DL (and optionally UL resources) to at least one UE within its radio coverage for DL (and optionally UL packet transmissions from the UE). The BS may communicate with one or more UEs in the radio communication system via the cells.

A cell may allocate sidelink (SL) resources for supporting the Proximity Services (ProSe) or Vehicle to Everything (V2X) services. Each cell may have overlapped coverage areas with other cells.

In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may include the SpCell of an MCG. A Primary SCG Cell (PSCell) may include the SpCell of an SCG. MCG may include a group of serving cells associated with the Master Node (MN), including the SpCell and optionally one or more Secondary Cells (SCells). An SCG may include a group of serving cells associated with the Secondary Node (SN), including the SpCell and optionally one or more SCells.

As discussed above, the frame structure for NR may support flexible configurations for accommodating various next generation (e.g., 5G) communication requirements, such as Enhanced Mobile Broadband (eMBB), Massive Machine Type Communication (mMTC), and Ultra-Reliable and Low-Latency Communication (URLLC), while fulfilling high reliability, high data rate, and low latency requirements. The Orthogonal Frequency-Division Multiplexing (OFDM) technology in the 3GPP may serve as a baseline for an NR waveform. The scalable OFDM numerology, such as adaptive sub-carrier spacing, channel bandwidth, and Cyclic Prefix (CP), may also be used.

Two coding schemes may be considered for NR, specifically, Low-Density Parity-Check (LDPC) code and Polar Code. The coding scheme adaption may be configured based on channel conditions and/or service applications.

At least the DL transmission data, a guard period, and UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

Any two or more than two of the following paragraphs, (sub)-bullets, points, actions, behaviors, terms, or claims described in the present disclosure may be combined logically, reasonably, and properly to form a specific method.

Any sentence, paragraph, (sub)-bullet, point, action, behaviors, terms, or claims described in the present disclosure may be implemented independently and separately to form a specific method.

Dependency, e.g., "based on", "more specifically", "preferably", "in one embodiment", "in some implementations", etc., in the present disclosure is just one possible example which would not restrict the specific method.

In some implementations, all the designs/embodiment/implementations introduced within this disclosure are not limited to be applied for dealing with the problems discussed within this disclosure. For example, the described embodiments may be applied to solve other problems that exist in the RAN of wireless communication systems. In some implementations, all of the numbers listed within the designs/embodiment/implementations introduced within this disclosure are just examples and for illustration, for example, of how the described methods are executed.

The term "A and/or B" within the present disclosure means "A", "B", or "A and B". The term "A and/or B and/or C" within the present disclosure means "A", "B", "C", "A and B", "A and C", "B and C", or "A and B and C". The term "A/B" within the present disclosure means "A" or "B".

Examples of some selected terms in the present disclosure are provided as follows.

BWP: A subset of the total cell bandwidth of a cell is referred to as a Bandwidth Part (BWP) and a Bandwidth Adaptation (BA) may be achieved by configuring the UE with BWP(s) and instructing the UE which of the configured BWPs is currently the active one. To enable a BA on the PCell, the BS (e.g., a gNB) configures the UE with UL and DL BWP(s). To enable the BA on SCells, when CA is deployed, the BS configures the UE with one or more DL BWPs. It should be noted that there may be no BWP in the UL. For the PCell, the initial BWP is the BWP used for an initial access. For the SCell(s), the initial BWP is the BWP configured for the UE to operate after an SCell activation. The UE may be configured with a first active uplink BWP by a firstActiveUplinkBWP IE. If the first active uplink BWP is configured for an SpCell, the firstActiveUplinkBWP IE field may contain the ID of the UL BWP to be activated upon performing the RRC (re-)configuration. If such a field is absent, the RRC (re-)configuration may not impose a BWP switching. If the first active uplink BWP is configured for an SCell, the firstActiveUplinkBWP IE field may contain the ID of the uplink bandwidth part to be used upon the MAC-activation of an SCell.

PCell: For a UE configured with the CA, the UE may only have an RRC connection with the network. During the RRC connection establishment/re-establishment/handover, the serving cell may provide the Non-Access Stratum (NAS) mobility information. During the RRC connection re-establishment/handover, the serving cell may provide the security input. This serving cell may be referred to as the PCell.

PUCCH SCell: For a UE configured with the CA, the UE may be configured with a cell other than PCell, on which the PUCCH resource is configured. This cell may be referred to as the PUCCH SCell.

A CSI report configuration (e.g., the CSI-ReportConfig) may be used for configuring the CSI reporting. FIG. 1 is a schematic diagram illustrating a hierarchical structure of a CSI report configuration IE (e.g., the CSI-ReportConfig 100), according to an example implementation of the present disclosure.

As illustrated in FIG. 1, the CSI-ReportConfig 100 may include the following particular IEs (a)-(j).

(a) the reportConfigId 102,
(b) the carrier 104,
(c) the resourcesForChannelMeasurement 106,
(d) the csi-IM-ResourcesForInterference 108,
(e) the nzp-CSI-RS-ResourcesForInterference 110,
(f) the reportConfigType 112,
(g) the reportQuantity 114,
(h) the reportFreqConfiguration 116,
(i) the codebookConfig 118, and
(j) the cqi-Table 120.

The reportConfigType 112 may include the following particular IEs (a)-(d).

(a) the periodic 122,
(b) the semiPersistentOnPUCCH 124,
(c) the semiPersistentOnPUSCH 126, and
(d) the aperiodic 128.

The periodic 122 may include the following particular IEs (a) and (b).

(a) the reportSlotConfig 130, and
(b) the pucch-CSI-ResourceList 132.

The semiPersistentOnPUCCH 124 may include the following particular IEs (a) and (b).

(a) the reportSlotConfig 134, and
(b) the pucch-CSI-ResourceList 136.

The semiPersistentOnPUSCH 126 may include the following particular IEs (a)-(c).

(a) the reportSlotConfig 138,
(b) the reportSlotOffsetList 140, and
(c) the p0alpha 142.

The aperiodic 128 may include a particular IE (e.g., the reportSlotOffsetList 144).

In some implementations, the carrier 104 may indicate in which serving cell a particular IE (e.g., CSI-ResourceConfig) is to be found. If the carrier 104 is absent, the resources may be in the same serving cell as the report configuration.

In some implementations, the codebookConfig 118 may indicate the codebook configuration for Type-1 or Type-2, including the codebook subset restriction. If a particular IE (e.g., the codebookConfig-r16) is present, the UE may ignore the codebookConfig 118 (e.g., without the suffix).

In some implementations, the cqi-Table 120 may indicate which CQI table is used for the CQI calculation (e.g., as specified in the 3GPP TS 38.214).

In some implementations, the csi-IM-ResourcesForInterference 108 may indicate the CSI-IM resources for interference measurement. A particular IE (e.g., the csi-ResourceConfigId) may indicate the CSI-ResourceConfig included in the serving cell configuration indicated by the carrier 104. The CSI-ResourceConfig may indicate the CSI-IM resources. A particular IE (e.g., the bwp-Id) in the CSI-ResourceConfig may be the same as the bwp-Id in the CSI-ResourceConfig indicated by the resourcesForChannelMeasurement 106.

In some implementations, the nzp-CSI-RS-ResourcesForInterference 110 may indicate the NZP CSI-RS resources for an interference measurement. The csi-ResourceConfigId may indicate the CSI-ResourceConfig included in the serving cell configuration indicated by the carrier 104. The CSI-ResourceConfig may indicate the NZP CSI-RS resources. The bwp-Id in the CSI-ResourceConfig may be the same as the bwp-Id in the CSI-ResourceConfig indicated by resourcesForChannelMeasurement 106.

In some implementations, the pucch-CSI-ResourceList 132, 136 may indicate which PUCCH resource is used for reporting on the PUCCH.

In some implementations, the reportConfigType 112 may indicate the time domain information for the report configuration.

In some implementations, the reportFreqConfiguration 116 may indicate the frequency domain information for the report configuration (e.g., as specified in the 3GPP TS 38.214).

In some implementations, the reportQuantity 114 may indicate the CSI-related quantities to report (e.g., as specified in the 3GPP TS 38.214). If a particular IE (e.g., the reportQuantity-r16) is present, the UE may ignore the reportQuantity 114 (e.g., without the suffix).

In some implementations, the reportSlotConfig 130, 134, 138 may indicate the periodicity and slot offset (e.g., as specified in the 3GPP TS 38.214). If a particular IE (e.g., the reportSlotConfig-v1530) is present, the UE may ignore the value provided in the reportSlotConfig 130, 134, 138 (without the suffix).

In some implementations, the reportSlotOffsetList 140, a particular IE (e.g., the reportSlotOffsetListForDCI-Format0-1), and/or a particular IE (e.g., the reportSlotOffsetListForDCI-Format0-2) may indicate the timing offset Y for semi-persistent reporting using the PUSCH. These fields may list the allowed offset values. The list may have the same number of entries as a particular IE (e.g., the pusch-TimeDomainAllocationList) in the PUSCH configuration (e.g., the PUSCH-Config).

In some implementations, a particular value may be indicated in the DCI to indicate the configured slot offset. For example, the network may indicate, via a DCI field of the UL grant, which one of the configured report slot offsets is applied. The DCI value 0 may correspond to the first report slot offset in the list, the DCI value 1 may correspond to the second report slot offset in the list, and so on. The first report may be transmitted in slot n+Y, and the second report may be transmitted in slot n+Y+P, where P may be the configured periodicity. For aperiodic reporting using the PUSCH, the list functions similarly with the same offset logic applied.

In some implementations, the resourcesForChannelMeasurement 106 may indicate the resources for channel measurement. The csi-ResourceConfigId may indicate the CSI-ResourceConfig included in the configuration of the serving cell indicated by the carrier 104. The CSI-ResourceConfig may indicate the NZP CSI-RS and/or SSB resources. The CSI-ReportConfig may be associated with the DL BWP indicated by the bwp-Id in the CSI-ResourceConfig.

Figure 2:
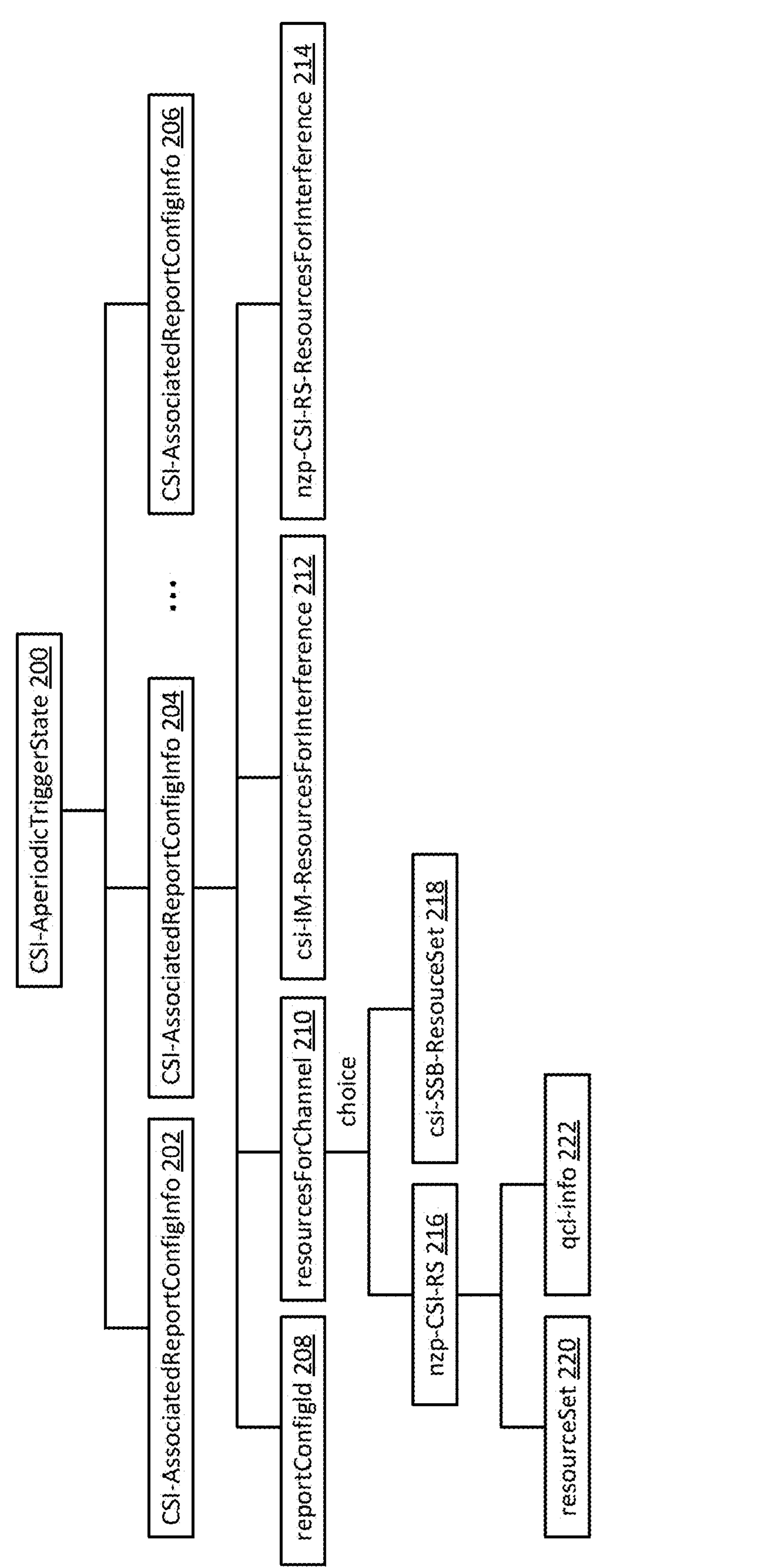
FIG. 2 is a schematic diagram illustrating a hierarchical structure of an information element of a triggering state associated with aperiodic CSI reporting, according to an example implementation of the present disclosure.

A particular IE (e.g., the CSI-AperiodicTriggerState) may be used for configuring the triggering state for aperiodic CSI reporting. FIG. 2 is a schematic diagram illustrating a hierarchical structure of an information element of a triggering state associated with aperiodic CSI reporting (e.g., the CSI-AperiodicTriggerState 200), according to an example implementation of the present disclosure.

As illustrated in FIG. 2, the CSI-AperiodicTriggerState 200 may include multiple particular IEs (e.g., the CSI-AssociatedReportConfigInfo 202, 204, 206).

Each of the CSI-AssociatedReportConfigInfo 202, 204, 206 may include the following particular IEs (a)-(d).

(a) the reportConfigId 208, (b) the resourceForChannel 210, (c) the csi-IM-ResourcesForInterference 212, and (d) the nzp-CSI-RS-ResourcesForInterference 214.

The resourceForChannel 210 may include the following particular IEs (a) and (b).

(a) the nzp-CSI-RS 216, and (b) the csi-SSB-ResourceSet 218.

The nzp-CSI-RS 216 may include the following particular IEs (a) and (b).

(a) the resourceSet 220, and (b) the qcl-info 222.

In some implementations, the csi-IM-ResourcesForInterference 212 may be used for interference measurements. The entry number may correspond to a particular IE (e.g., the csi-IM-ResourceSetList) in the CSI-ResourceConfig, and may be indicated by the csi-IM-ResourcesForInterference 212 in the CSI-ReportConfig. The CSI-ReportConfig may be indicated by the reportConfigId 208 (e.g., the value 1 may correspond to the first entry, the value 2 may correspond to the second entry, and so on). The CSI-IM-ResourceSet may indicate the same number of resources as indicated by a particular IE (e.g., the NZP-CSI-RS-ResourceSet) indicated by a particular IE (e.g., the nzp-CSI-RS-ResourcesForChannel).

In some implementations, the csi-SSB-ResourceSet 218 may be used for channel measurements. The entry number may correspond to a particular IE (e.g., the csi-SSB-ResourceSetList) in the CSI-ResourceConfig, and may be indicated by the resourcesForChannelMeasurement in the CSI-ReportConfig. The CSI-ReportConfig may be indicated by the reportConfigId 208 (e.g., the value 1 may correspond to the first entry, the value 2 may correspond to the second entry, and so on).

In some implementations, the nzp-CSI-RS-ResourcesForInterference 214 may be used for interference measurements. The entry number may correspond to a particular IE (e.g., the nzp-CSI-RS-ResourceSetList) in the CSI-ResourceConfig, and may be indicated by the nzp-CSI-RS-ResourcesForInterference 214 in the CSI-ReportConfig. The CSI-ReportConfig may be indicated by the reportConfigId 208 (e.g., the value 1 may correspond to the first entry, the value 2 may correspond to the second entry, and so on).

In some implementations, the qcl-info 222 may indicate a list of references to TCI states for determining the QCL source and QCL type for each NZP CSI-RS resource listed in the NZP-CSI-RS-ResourceSet indicated by the nzp-CSI-RS-ResourcesForChannel. A particular IE (e.g., the TCI-StateId) may be used to indicate the TCI state. The TCI-StateId may be defined in a particular IE (e.g., the tci-StatesToAddModList) in the PDSCH configuration (e.g., the PDSCH-Config) included in a particular IE (e.g., the BWP-Downlink). The BWP-Downlink may correspond to the serving cell and the DL BWP to which the resources for channel measurement belong (e.g., as indicated in the CSI-ReportConfig indicated by the reportConfigId 208). The first entry in a particular IE (e.g., the qcl-info-forChannel) may correspond to the first entry in the nzp-CSI-RS-Resources of the NZP-CSI-RS-ResourceSet, the second entry may correspond to the second entry in the nzp-CSI-RS-Resources of the NZP-CSI-RS-ResourceSet, and so on (e.g., as specified in the 3GPP TS 38.214).

In some implementations, the reportConfigId 208 may indicate a report configuration ID in a particular IE (e.g., the CSI-ReportConfigToAddMod) configured in a CSI measurement configuration (e.g., the CSI-MeasConfig).

In some implementations, the resourceSet 220 may indicate the NZP-CSI-RS-ResourceSet for channel measurements. The entry number may correspond to the nzp-CSI-RS-ResourceSetList in the CSI-ResourceConfig, and may be indicated by the resourcesForChannelMeasurement in the CSI-ReportConfig. The CSI-ReportConfig may be indicated by the reportConfigId 208 (e.g., the value 1 may correspond to the first entry, the value 2 may correspond to the second entry, and so on).

The network energy saving (NES) may be of great importance in reducing the environmental impact, such as the greenhouse gas emissions. The environmental impact of 5G may need to stay under control, and solutions to improve the network energy savings may need to be developed. In the NR systems, according to the legacy DL MIMO procedures, the adaptation of spatial elements may be achieved through the RRC (re-)configurations, such as CSI-RS (re-)configurations, in a semi-static manner. This adaptation may help reduce the overall energy consumption of the network. Moreover, to enhance the current CSI framework for measurement and reporting, a further issue may be how to meet the requirement regarding the NES.

The time and frequency resources that are used by the UE to report the CSI may be controlled by the base station (e.g., gNB). The CSI may include the CQI, PMI, CRI, SSBRI, LI, RI, L1-RSRP, and/or L1-SINR.

For CQI, PMI, CRI, SSBRI, LI, RI, L1-RSRP, the UE may be configured, via higher layer parameters, with N CSI-ReportConfigs, M CSI-ResourceConfigs, and one or two triggering state list(s). N may be the number of CSI report configurations, and N≥1. M may be the number of CSI resource configurations, and M≥1. Each triggering state list may include one or more triggering states (e.g., configured by the higher layer parameters, such as the CSI-AperiodicTriggerStateList and the CSI-SemiPersistentOnPUSCH-TriggerStateList).

Each triggering state in the CSI-AperiodicTriggerStateList may be associated with a list of CSI-ReportConfigs indicating the resource det IDs for the channel measurements and optionally for the interference measurements. Each triggering state in the CSI-SemiPersistentOnPUSCH-TriggerStateList may be associated with a CSI-ReportConfig.

Each CSI-ReportConfig may be associated with a single DL BWP (e.g., indicated by a particular higher layer parameter, such as the BWP-Id) given in the associated CSI-ResourceConfig for the channel measurements. Each CSI-ReportConfig may include the parameters for a band for CSI reporting. These parameters may include the codebook configuration including codebook subset restriction, time-domain behavior, frequency granularity for CQI and PMI, measurement restriction configurations, and the CSI-related quantities to be reported by the UE (e.g., LI, L1-RSRP, L1-SINR, CRI, and/or SSBRI).

Each CSI-ResourceConfig may include a configuration of a list of S CSI resource sets (e.g., given by a particular higher layer parameter, such as the csi-RS-ResourceSetList). S may be the number of CSI resource sets, and S≥1. The list of S CSI resource sets may include at least one of the NZP CSI-RS resource set(s) and the SS/PBCH block set(s). The list of S CSI resource sets may include the CSI-IM resource set(s). Each CSI-ResourceConfig may be associated with a DL BWP indicated by a particular higher layer parameter (e.g., the BWP-Id), and all CSI-ResourceConfigs associated with a CSI-ReportConfig may associated with the same DL BWP.

A triggering state may be initiated via the CSI request field in the DCI format 0_1/0_2. When all bits of the CSI request field in the DCI are set to zero, the CSI may not be requested. When the number of configured triggering states in the CSI-AperiodicTriggerStateList is greater than $2^{N_{TS}}-1$, where $N_{TS}$ may be the number of bits in the CSI request field in the DCI, the UE may receive a sub-selection indication as specified in the 3GPP TS 38.321. The sub-selection indication may be used to map up to $2^{N_{TS}}-1$ triggering states to the codepoints of the CSI request field in the DCI. The $N_{TS}$ may be configured by a particular higher layer parameter (e.g., the reportTriggerSize). When the number of the CSI triggering states in the CSI-AperiodicTriggerStateList is less than or equal to $2^{N_{TS}}-1$, the CSI request field in the DCI may directly indicate the triggering state.

When the aperiodic CSI-RS is used for aperiodic CSI reporting, the CSI-RS offset may be configured per resource set by a particular higher layer parameter (e.g., the aperiodicTriggeringOffset). In some implementations, when (i) the aperiodic CSI-RS is used for aperiodic reporting, (ii) the UE is not configured with a particular parameter (e.g., the minimumSchedulingOffset) for any DL or UL BWP, and (iii) all triggering states are not associated with a particular higher layer parameter (e.g., the qcl-Type) set to 'QCL-TypeD' in the corresponding TCI states, the CSI-RS offset may be configured per resource set by the aperiodicTriggeringOffset. The CSI-RS offset may include the values of {0, 1, 2, 3, 4, 5, 6, . . . , 15, 16, 24} slots for u<=3, or values of {0, 4, 8, 12, . . . , 60, 64, 96} slots for u=5 and u=6, where u may be the subcarrier spacing configurations for the CSI-RS. If the UE is not configured with the minimumSchedulingOffset for any DL or UL BWP and all triggering states are not associated with the qcl-Type set to 'QCL-TypeD' in the corresponding TCI states, the CSI-RS offset may be fixed and may be set to zero. The CSI-RS offset of the CSI-IM may follow the CSI-RS offset of the associated NZP CSI-RS for the channel measurements.

The PUSCH resource for A-CSI reporting may be indicated by the DCI format 0_1/0_2 triggering the A-CSI reporting. The PRBs for the PUSCH may be indicated in the FDRA field of the DCI, and the time behavior of the corresponding symbols for the PUSCH may be indicated by the TDRA field of the DCI.

The UL-SCH indicator field in the DCI may indicate whether the A-CSI is multiplexed with the UL-SCH. When the UL-SCH indicator field is set to '1', (i) the A-CSI may be multiplexed with the UL-SCH, (ii) the number of REs for the A-CSI may be determined as specified in the 3GPP TS 38.212, and (iii) the slot $n+K_2$ in which the PUSCH is transmitted may be determined by the entry for $K_2$ value in the row of the TDRA table, where the row of the TDRA table may be indicated by the TDRA field of the DCI transmitted in slot n. When the UL-SCH indicator field is set to '0', (i) the A-CSI may be mapped on the REs allocated for the PUSCH, (ii) the slot in which the PUSCH is transmitted may be determined by the TDRA field value m of the DCI transmitted in slot n, and (iii) the $K_2$ value may be determined as follows: $K_2=\max_j Y_j(m+1)$, where $Y_j$, with $j=0, \ldots, N_{Rep}-1$, may represent the corresponding list entries of the reportSlotOffsetList in the CSI-ReportConfig for the $N_{Rep}$ triggered CSI report configurations. $Y_j(m+1)$ may correspond to the (m+1)th entry of $Y_j$.

The slot where the UE transmits the PUSCH may be determined as follows:

$$\left\lfloor n \cdot \frac{2^{\mu_{PUSCH}}}{2^{\mu_{PDCCH}}} \right\rfloor + K_2,$$

where n may be the slot with the scheduling DCI, $K_2$ may be based on the numerology of the PUSCH, and $\mu_{PUSCH}$ and $\mu_{PDCCH}$ may be the subcarrier spacing configurations for the PUSCH and the PDCCH, respectively, To enable the mechanism of spatial domain adaptation for the NES. The association between the configuration and the triggering state may be discussed. With these associations, the combination of joint spatial domain (SD) and power domain (PD) adaptation may need to be defined. For the CSI report rule and CSI measurement requirement for the NES applications, the CSI mapping rule, CSI processing unit, and CSI computation time may need to be clarified. For the enhancement of the CSI framework, the CSI-IM configuration, CSI reference resource configuration, multiplexing, and the use of multiple PUCCH resources for CSI reporting may also need to be discussed.

For PD and SD adaptation, the associations of the sub-configurations and the triggering states may be needed. For example, the sub-configuration may be at the triggering state level or the report configuration level. For joint PD and SD adaptation, a sub-configuration may include configuration parameters (or information) for the PD and/or SD adaptations. The details of how to combine the PD and SD adaptation may need to be discussed. The CSI mapping rules across sub-configurations may also need to be discussed. A sub-configuration index may be newly introduced for the CSI mapping rule.

For NES purposes with a multi-CSI framework, if the physical processing resources (e.g., the channel state information (CSI) processing unit (CPU) are not sufficient to handle the CSI, the CSI may be dropped. The overall CSI occupation may need to be discussed. The CSI computation time for the UE may need to be modified, as the multiple sub-configurations of the report may increase the processing load of the UE. For SD and/or PD adaptations, a resource may be associated with multiple sub-configurations. Therefore, some mechanisms to indicate the association of a CSI-RS resource and a CSI-IM resource may need to be discussed.

For a CSI report configuration (e.g., the CSI-ReportConfig) with multiple sub-configurations, the definition of a particular parameter (e.g., the $n_{CSI\_ref}$) may need to be newly defined. Further discussion may be required regarding the maximum number of spatial patterns, sub-configurations, and the total number of CSI-RS resources. The CSI reporting involving multiple sub-configurations may result in a larger payload size compared to the legacy reporting method. Therefore, the rate matching for the multiplexing may need to be updated. The PUCCH resource for P-CSI/SP-CSI reporting involving multiple sub-configurations may not be sufficient. Even if the CSI dropping rule may be updated to the sub-configuration level, the retransmission of dropped CSI may be necessary. Additionally, the retransmitted CSI may become outdated due to time delays. The network may configure a list of multiple PUCCH resources corresponding to different sets of sub-configurations.

Mechanism of Spatial Adaptation for NES

The enhancement of the CSI framework for CSI measurement and reporting involving multiple sub-configurations may include the associations between the configurations and the triggering states, and may include the indications of the joint SD and PD adaptation, the CSI mapping rule, the CSI processing unit, the CSI computation time, the CSI-IM configuration, the CSI reference resource configuration, multiplexing, and multiple PUCCHs for reporting.

Configuration and Triggering State

For A-CSI reporting involving multiple sub-configurations, an indication for N sub-configurations out of L sub-configurations for a triggering state may be configured in the CSI-AssociatedReportConfigInfo.

Table 1 below illustrates information of the CSI-AperiodicTriggerStateList IE, according to an example implementation of the present disclosure.

TABLE 1

```
CSI-AperiodicTriggerStateList information element
-- ASN1START
-- TAG-CSI-APERIODICTRIGGERSTATELIST-START
CSI-AperiodicTriggerStateList ::= SEQUENCE (SIZE (1..maxNrOfCSI-
AperiodicTriggers)) OF CSI-AperiodicTriggerState
CSI-AperiodicTriggerState ::= SEQUENCE {
  associatedReportConfigInfoList SEQUENCE (SIZE
(1..maxNrofReportConfigPerAperiodicTrigger)) OF CSI-
AssociatedReportConfigInfo,
  ...,
  [[
  ap-CSI-MultiplexingMode-r17 ENUMERATED {enabled} OPTIONAL -- Need
R
  ]]
}
CSI-AssociatedReportConfigInfo ::= SEQUENCE {
  reportConfigId CSI-ReportConfigId,
  resourcesForChannel CHOICE {
    nzp-CSI-RS SEQUENCE {
      resourceSet INTEGER (1..maxNrofNZP-CSI-RS-ResourceSetsPerConfig),
      qcl-info SEQUENCE (SIZE (1..maxNrofAP-CSI-RS-ResourcesPerSet)) OF
TCI-StateId OPTIONAL -- Cond Aperiodic
    },
    csi-SSB-ResourceSet INTEGER (1..maxNrofCSI-SSB-
ResourceSetsPerConfig)
},
    csi-IM-ResourcesForInterference INTEGER (1..maxNrofCSI-IM-
ResourceSetsPerConfig) OPTIONAL, -- Cond CSI-IM-ForInterference,
    nzp-CSI-RS-ResourcesForInterference INTEGER (1..maxNrofNZP-CSI-RS-
ResourceSetsPerConfig) OPTIONAL, -- Cond NZP-CSI-RS-ForInterference
  ...,
  [[
  resourcesForChanne12-r17 CHOICE {
    nzp-CSI-RS2-r17 SEQUENCE {
      resourceSet2-r17 INTEGER (1..maxNrofNZP-CSI-RS-
ResourceSetsPerConfig) ,
      qcl-info2-r17 SEQUENCE (SIZE (1..maxNrofAP-CSI-RS-
ResourcesPerSet)) OF TCI-StateId
          OPTIONAL -- Cond Aperiodic
    },
    csi-SSB-ResourceSet2-r17 INTEGER (1..maxNrofCSI-SSB-
ResourceSetsPerConfigExt)
  } OPTIONAL -- Cond NoUnifiedTCI
    csi-SSB-ResourceSetExt INTEGER (1..maxNrofCSI-SSB-
ResourceSetsPerConfigExt) OPTIONAL -- Need R
]]
}
-- TAG-CSI-APERIODICTRIGGERSTATELIST-STOP
-- ASN1STOP
```

In some implementations, the indication for N sub-configurations out of L sub-configurations for a triggering state may be accomplished by the RRC, the MAC CE, and/or the DCI.

Method 1: The sub-configurations may be configured/implemented at the triggering state level. If the sub-configurations are configured/implemented at triggering state level, the CSI report configurations associated with the same triggering state may include the same combination of sub-configurations.

A particular IE (e.g., the csi-ReportSubConfigTriggerList) may be used to indicate a list of sub-configuration TDs of N sub-configurations out of L configured sub-configurations included in the CSI-ReportConfig associated with a triggering state for aperiodic CSI reporting on the PUSCH.

Table 2 below illustrates information of the CSI-AperiodicTriggerStateList IE, according to an example implementation of the present disclosure.

TABLE 2

```
CSI-AperiodicTriggerStateList information element
-- ASN1START
-- TAG-CSI-APERIODICTRIGGERSTATELIST-START
CSI-AperiodicTriggerStateList ::= SEQUENCE (SIZE (1..maxNrOfCSI-
AperiodicTriggers)) OF CSI-AperiodicTriggerState
CSI-AperiodicTriggerState ::= SEQUENCE {
  associatedReportConfigInfoList SEQUENCE (SIZE
(1..maxNrofReportConfigPerAperiodicTrigger)) OF CSI-
AssociatedReportConfigInfo,
  ...,
  [[
  ap-CSI-MultiplexingMode-r17 ENUMERATED {enabled} OPTIONAL -- Need
R
  ]],
  [[
  ltm-AssociatedReportConfigInfo-r18 LTM-CSI-ReportConfigId-r18 OPTIONAL
-- Need R
  ]]
}
CSI-AssociatedReportConfigInfo ::= SEQUENCE {
  reportConfigId CSI-ReportConfigId,
  resourcesForChannel CHOICE {
    nzp-CSI-RS SEQUENCE {
        resourceSet INTEGER (1..maxNrofNZP-CSI-RS-ResourceSetsPerConfig),
        qcl-info SEQUENCE (SIZE (1..maxNrofAP-CSI-RS-ResourcesPerSet)) OF
TCI-StateId OPTIONAL -- Cond Aperiodic
    },
    csi-SSB-ResourceSet INTEGER (1..maxNrofCSI-SSB-
ResourceSetsPerConfig)
},
    csi-IM-ResourcesForInterference INTEGER (1..maxNrofCSI-IM-
ResourceSetsPerConfig) OPTIONAL, -- Cond CSI-IM-ForInterference,
    nzp-CSI-RS-ResourcesForInterference INTEGER (1..maxNrofNZP-CSI-RS-
ResourceSetsPerConfig) OPTIONAL, -- Cond NZP-CSI-RS-ForInterference
  ...,
  [[
  resourcesForChannel2-r17 CHOICE {
    nzp-CSI-RS2-r17 SEQUENCE {
        resourceSet2-r17 INTEGER (1..maxNrofNZP-CSI-RS-
ResourceSetsPerConfig),
        qcl-info2-r17 SEQUENCE (SIZE (1..maxNrofAP-CSI-RS-
ResourcesPerSet)) OF TCI-StateId
          OPTIONAL -- Cond Aperiodic
    },
    csi-SSB-ResourceSet2-r17 INTEGER (1..maxNrofCSI-SSB-
ResourceSetsPerConfigExt)
  } OPTIONAL -- Need R
    csi-SSB-ResourceSetExt INTEGER (1..maxNrofCSI-SSB-
ResourceSetsPerConfigExt) OPTIONAL -- Need R
  ]],
  [[
  resourcesForChannelTDCP-r18 SEQUENCE {
    resourceSet2TDCP-r18 INTEGER (1..maxNrofNZP-CSI-RS-
ResourceSetsPerConfig),
    resourceSet3TDCP-r18 INTEGER (1..maxNrofNZP-CSI-RS-
ResourceSetsPerConfig), OPTIONAL -- Need R
} OPTIONAL, -- Cond TDCP
  applyIndicatedTCI-State-r18 CHOICE {
      perSet-r18 ENUMERATED {first, second},
      perResource-r18 SEQUENCE (SIZE(1..maxNrofAP-CSI-RS-
ResourcesPerSet) OF ENUMERATED {first, second}
} OPTIONAL, -- Cond ApplyIndicatedTCI
  applyIndicatedTCI-State2-r18 CHOICE {
      perSet-r18 ENUMERATED {first, second},
      perResource-r18 SEQUENCE (SIZE(1..maxNrofAP-CSI-RS-
ResourcesPerSet) OF ENUMERATED {first, second}
} OPTIONAL, -- Cond SecondCSICMR
  Csi-ReportSubConfigTriggerList-r18 CSI-ReportSubConfigTriggerList-r18
OPTIONAL - Need R
]]
}
```

Method 2: The sub-configurations may be configured/implemented at the report configuration level. If the sub-configurations are configured/implemented at the report configuration level, a nested configuration may be used. An indication may be used for N sub-configurations out of L sub-configurations for a triggering state for SP-CSI reporting on PUSCH. For SP-CSI reporting on the PUSCH that involves multiple sub-configurations, an indication for N sub-configurations out of L sub-configurations for a triggering state may be configured in a particular IE (e.g., the CSI-SemiPersistentOnPUSCH-TriggerState).

Table 3 below illustrates information of the CSI-SemiPersistentOnPUSCH-TriggerStateList IE, according to an example implementation of the present disclosure.

TABLE 3

```
CSI-SemiPersistentOnPUSCH-TriggerStateList information element
-- ASN1START
-- TAG-CSI- SEMIPERSISTENTONPUSCHTRIGGERSTATELIST-START
CSI-SemiPersistentOnPUSCH-TriggerStateList ::= SEQUENCE (SIZE
(1..maxNrOfSemiPersistentPUSCH-Triggers)) OF CSI-SemiPersistentOnPUSCH-
TriggerState
CSI-SemiPersistentOnPUSCH-TriggerState ::= SEQUENCE {
   associatedReportConfigInfo CSI-ReportConfigId,
   ...,
   [[
   sp-CSI-MultiplexingMode-r17 ENUMERATED {enabled} OPTIONAL -- Need R
   ]]
}
-- TAG-CSI- SEMIPERSISTENTONPUSCHTRIGGERSTATELIST -STOP
-- ASN1STOP
```

A codepoint of the CSI request field in the DCI may be mapped to a triggering state associated with the SP-CSI reporting based on the order of the position of the configured triggering states in the CSI-SemiPersistentOnPUSCH-TriggerStateList, where the codepoint '0' may be mapped to a triggering state of the first position in the CSI-SemiPersistentOnPUSCH-TriggerStateList. The mapping between the triggering state and the CSI-ReportConfig may be one-to-one. The network may need another field, besides the CSI request field, to indicate the N sub-configurations from the L sub-configurations. The indication method for this new field may be indexing or bit mapping.

Joint SD and PD Adaptation

For joint PD and SD adaptation, a sub-configuration may include configuration parameters (or information) for the PD and/or SD adaptations. The newly introduced sub-configuration index (e.g., SubConfig x) may be included in the CSI-ReportConfig. In the sub-configuration, the configuration parameters (or information) for the PD and/or SD adaptations may override the original counterparts. The sub-configuration in a sub-configuration list (e.g., indicated by a particular IE, such as the SubConfigList) may include the configuration parameters (or information) for the SD adaptation, the configuration parameters (or information) for the PD adaptation, or the configuration parameters (or information) for both the SD and PD adaptations.

Table 4 below illustrates information of the SubConfigList IE included in the CSI-ReportConfig, according to an example implementation of the present disclosure.

TABLE 4

```
- CSI-ReportConfig
  - SubConfigList
    - SubConfig 1:
      - Spatial Domain Adaptation - Type1 32 ports config
      - Power Domain Adaptation - {−5dBs}
  - SubConfig 2:
      - Spatial Domain Adaptation - Type1 16 ports config
      - Power Domain Adaptation - {−3dBs}
  - SubConfig 3:
      - Spatial Domain Adaptation - Type1 8 ports config
```

As illustrated in Table 4, the SubConfigList may include three sub-configurations (e.g., the Subconfig 1, the Subconfig 2, and the Subconfig 3). The Subconfig may include the configuration parameters (or information) for the joint SD and PD adaptation. The configuration parameters (or information) for the SD adaptation included in the Subconfig 1 may include an antenna port configuration (e.g., the Type1 32 ports config). The configuration parameters (or information) for the PD adaptation included in the Subconfig 1 may include a power offset value (e.g., −5 dBs). The Subconfig 2 may include the configuration parameters (or information) for the joint SD and PD adaptation. The configuration parameters (or information) for the SD adaptation included in the Subconfig 2 may include an antenna port configuration (e.g., the Type1 16 ports config). The configuration parameters (or information) for the PD adaptation included in the Subconfig 2 may include a power offset value (e.g., −3 dBs). The Subconfig 3 may include the configuration parameters (or information) for the SD adaptation. The configuration parameters (or information) for the SD adaptation included in the Subconfig 3 may include an antenna port configuration (e.g., the Type1 8 ports config). If the sub-configuration (e.g., the SubConfig) is included in the CSI-ReportConfig, the configuration parameters (or information) for at least one of the PD adaptation or the SD adaptation may be included in the SubConfig.

Method 1: The sub-configurations may be configured at the triggering state level 1. The triggering state may be associated with a particular IE (e.g., the SubConfigTriggerList) which is a subset of the SubConfigList. Table 5 below illustrates the associations between the triggering states and the SubConfigTriggerLists, according to an example implementation of the present disclosure.

TABLE 5

```
- Triggering State 1
    - SubConfigTriggerList :{1}
- Triggering State 2
    - SubConfigTriggerList :{2}
- Triggering State 3
    - SubConfigTriggerList :{2, 3}
```

The selection of N sub-configurations from L sub-configurations may be triggered via the lower layer. As illustrated in Table 5, the SubConfigTriggerList associated with the Triggering State 1 may include the Subconfig 1 of the SubConfigList of the CSI-ReportConfig. The SubConfigTriggerList associated with the Triggering State 2 may include the Subconfig 2 of the SubConfigList of the CSI-ReportConfig. The SubConfigTriggerList associated with the Triggering State 3 may include the Subconfig 2 and Subconfig 3 of the SubConfigList of the CSI-ReportConfig. The ReportConfig associated with the same triggering state may include the same Subconfig combination.

Figure 3:
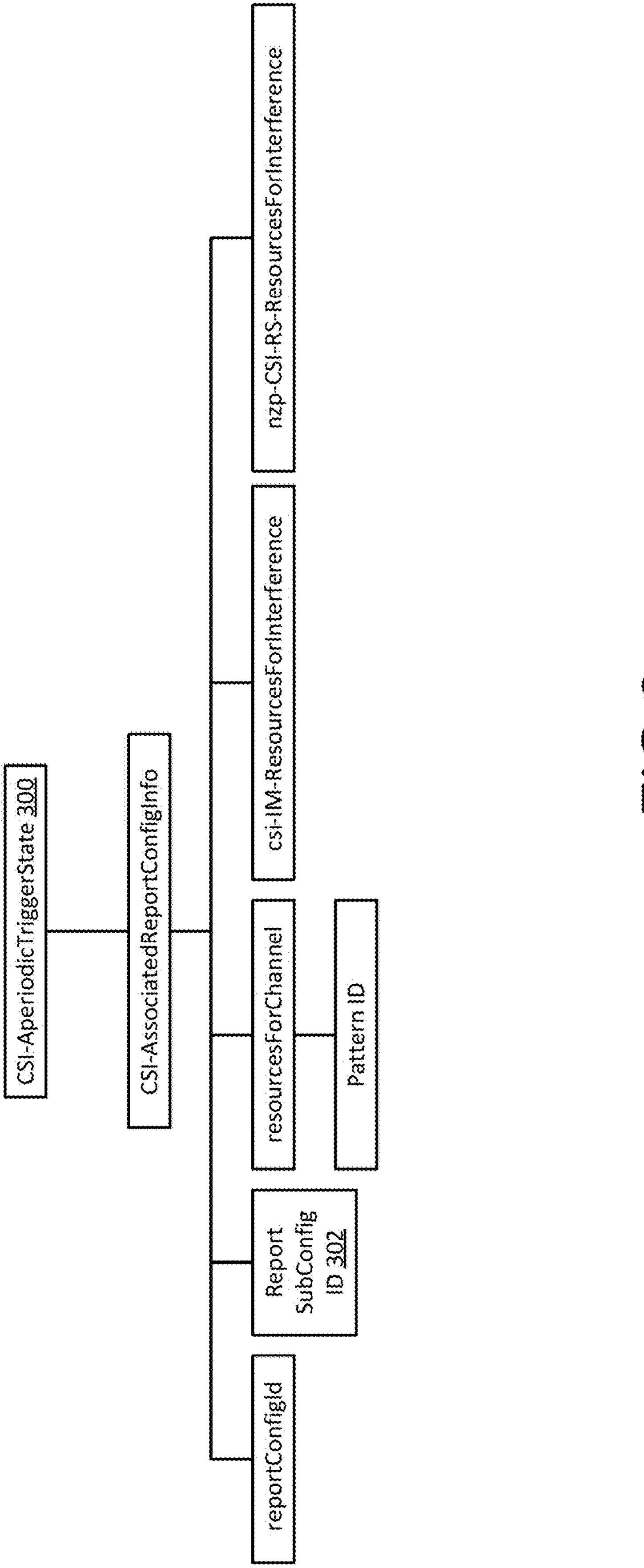
FIG. 3 is a schematic diagram illustrating a hierarchical structure of an information element of a triggering state associated with aperiodic CSI reporting, according to an example implementation of the present disclosure.

In some implementations, the network may configure only one report sub-configuration in the triggering state. FIG. 3 is a schematic diagram illustrating a hierarchical structure of an information element 300 of a triggering state associated with aperiodic CSI reporting (e.g., the CSI-AperiodicTriggerState 300), according to an example implementation of the present disclosure. For example, as illustrated in FIG. 3, the network may configure only one report sub-configuration (e.g., the Report SubConfig ID 302) in the triggering state (e.g., the CSI-AperiodicTriggerState 300).

Method 2: The sub-configurations may be configured at the triggering state level 2.

If multiple report configurations associated with the same triggering state are configured, a nested triggering method may be used for the report configurations. The triggering method may include the following steps (a) and (b).

(a) The MAC CE may be used to select/activate one or more report configurations associated with the triggering state. The selected report configurations may include the same sub-configuration combination.

(b) The DCI may further be used to indicate the SubConfigTriggerList for the selected report configurations. A new field in existing non-fallback UE specific DCI formats may be newly introduced.

Figure 4:
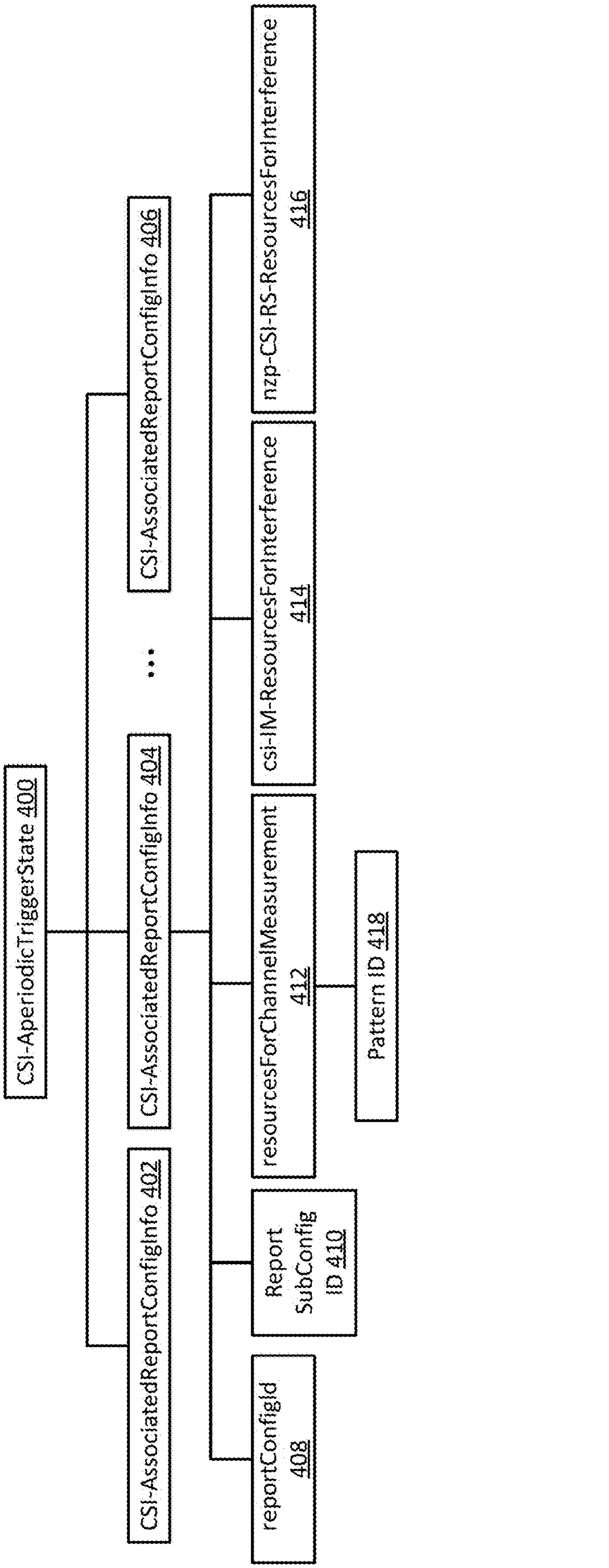
FIG. 4 is a schematic diagram illustrating a hierarchical structure of an information element of a triggering state associated with aperiodic CSI reporting, according to an example implementation of the present disclosure.

FIG. 4 is a schematic diagram illustrating a hierarchical structure of an information element 400 of a triggering state associated with aperiodic CSI reporting (e.g., the CSI-AperiodicTriggerState 400), according to an example implementation of the present disclosure. For example, as illustrated in FIG. 4, the CSI-AperiodicTriggerState 400 may be associated with one or more CSI-AssociatedReportConfig-Infos (e.g., the AssociatedReportConfigInfos 402, 404, and 406). Each CSI-AssociatedReportConfigInfo 402, 404, and 406 may include at least one of the reportConfigID 408, the ReportSubConfigID 410, the resourcesForChannelMeasurement 412, the csi-IM-ResourcesForInterference 414, and the nzp-CSI-RS-ResourcesForInterference 416. The resourcesForChannelMeasurement 412 may include the Pattern ID 418 for a channel measurement. In some implementations, the definitions of the IEs as illustrated in FIG. 0.4 may be as specified in the 3GPP TS 38.214.

Method 3: The sub-configurations may be configured at the report configuration level 1.

If multiple report configurations are configured in the same triggering state. A newly defined MAC CE may be used for selecting N sub-configuration from L sub-configurations for each CSI-AssociatedReportConfigInfo. The DCI may follow the legacy rule to indicate the triggering states of the CSI-AperiodicTriggerState.

As illustrated in Table 6, the MAC CE may be specific for the report configuration. The MAC CE (e.g., the MAC CE #1) may be used for selecting N1 sub-configurations from the SubConfigTriggerList for the AssociatedReportConfigInfo (e.g., the AssociatedReportConfigInfo #1). The MAC CE (e.g., the MAC CE #2) may be used for selecting the N2 sub-configurations from the same SubConfigTriggerList for the AssociatedReportConfigInfo (e.g., the AssociatedReportConfigInfo #2). Table 6 below illustrates associations among the MAC CE, the AssociatedReportConfigInfo, and the SubConfigTriggerList, according to an example implementation of the present disclosure.

TABLE 6

| |
|---|
| - AssociatedReportConfigInfo #1 (MAC CE #1) |
| - SubConfigTriggerList :{1...N1}(N1<=L) |
| - AssociatedReportConfigInfo #2 (MAC CE #2) |
| - SubConfigTriggerList :{1...N2}(N2<=L) |

Method 4: The sub-configurations may be configured at the report configuration level 2.

If multiple report configurations are configured in the same triggering state. A newly defined field in the MAC CE may be used for selecting N sub-configurations from L sub-configurations for each CSI-AssociatedReportConfig-Info. The DCI may follow the legacy rule to indicate the triggering states of the CSI-AperiodicTriggerState.

As illustrated in Table 7, a new MAC CE field may be specific for the report configuration. The MAC CE field (e.g., the MAC CE field #1) may select N1 sub-configurations from the SubConfigTriggerList for the AssociatedReportConfigInfo (e.g., the AssociatedReportConfigInfo #1). The MAC CE field #2 may select N2 sub-configurations from the same SubConfigTriggerList for the AssociatedReportConfigInfo (e.g., the AssociatedReportConfigInfo #2). Table 7 below illustrates associations among the MAC CE field, the AssociatedReportConfigInfo, and the SubConfigTriggerList, according to an example implementation of the present disclosure.

TABLE 7

| |
|---|
| - AssociatedReportConfigInfo #1 (MAC CE field #1) |
| - SubConfigTriggerList :{1...N1}(N1<=L) |
| - AssociatedReportConfigInfo #2 (MAC CE field #2) |
| - SubConfigTriggerList :{1...N2}(N2<=L) |

CSI Mapping Rule

For CSI mapping, the mapping order of the CSI fields of a CSI report may be given in the 3GPP TS 38.212, generally as: CRI→RI→LI→(zero padding)→PMI→CQI when applicable. In the case without two-part, the mapping order may be CRI→RI→CQI when applicable for CSI part 1 (e.g., as illustrated in Table 8 below), and CQI→LI→PMI when applicable for CSI part 2 (e.g., as illustrated in Table 9 or Table 10 below). Furthermore, multiple CSI reports may be mapped together based on the CSI report priority values as specified in the 3GPP TS 38.214, with CSI without two-part or CSI part 1 (e.g., as illustrated in Table 8 below), when applicable, mapped first.

The CSI mapping rule for CSI reporting involving multiple sub-configurations may be discussed. A sub-configuration level priority may be determined based on the order of the sub-configuration index. For CSI part 2 (e.g., as illustrated in Table 9 or Table 10 below) corresponding to each sub-configuration, omission may occur at the sub-configuration level. The sub-configuration index with a lower value may have a higher priority.

The CSI mapping rule for CSI report #n involving N sub-configurations may be discussed as follows. Table 8 below illustrates a mapping order of CSI fields of a CSI report (CSI part 1), according to an example implementation of the present disclosure.

TABLE 8

| CSI report number | CSI fields |
|---|---|
| CSI report #n CSI part 1 | CRI of sub-config#1 as in Tables 6.3.1.1.2-3/4/6 as specified in the 3GPP TS 38.212, if reported<br>Rank Indicator of sub-config#1 as in Tables 6.3.1.1.2-3/4/5 as specified in the 3GPP TS 38.212, if reported<br>Wideband CQI of sub-config#1 for the first TB as in Tables 6.3.1.1.2-3/4/5 as specified in the 3GPP TS 38.212, if reported<br>Subband differential CQI of sub-config#1 for the first TB with increasing order of subband number as in Tables 6.3.1.1.2-3/4/5 as specified in the 3GPP TS 38.212, if reported<br>. . .<br>CRI of sub-config#2 as in Tables 6.3.1.1.2-3/4/6 as specified in the 3GPP TS 38.212, if reported<br>Rank Indicator of sub-config#2 as in Tables 6.3.1.1.2-3/4/5 as specified in the 3GPP TS 38.212, if reported<br>Wideband CQI of sub-config#2 for the first TB as in Tables 6.3.1.1.2-3/4/5 as specified in the 3GPP TS 38.212, if reported<br>Subband differential CQI of sub-config#2 for the first TB with increasing order of subband number as in Tables 6.3.1.1.2-3/4/5 as specified in the 3GPP TS 38.212, if reported<br>CRI of sub-config#N as in Tables 6.3.1.1.2-3/4/6 as specified in the 3GPP TS 38.212, if reported<br>Rank Indicator of sub-config#N as in Tables 6.3.1.1.2-3/4/5 as specified in the 3GPP TS 38.212, if reported<br>Wideband CQI of sub-config#N for the first TB as in Tables 6.3.1.1.2-3/4/5 as specified in the 3GPP TS 38.212, if reported<br>Subband differential CQI of sub-config#N for the first TB with increasing order of subband number as in Tables 6.3.1.1.2-3/4/5 as specified in the 3GPP TS 38.212, if reported<br>Indicator of the number of non-zero wideband amplitude coefficients Mo for layer 0 as in Table 6.3.1.1.2-5 as specified in the 3GPP TS 38.212, if reported<br>Indicator of the number of non-zero wideband amplitude coefficients My for layer 1 as in Table 6.3.1.1.2-5 as specified in the 3GPP TS 38.212 (if the rank according to the reported RI is equal to one, this field is set to all zeros), if 2-layer PMI reporting is allowed according to the rank restriction in the 3GPP TS 38.214 and if reported |

Note:
Subbands for given CSI report n indicated by the higher layer parameter csi-ReportingBand are numbered continuously in the increasing order with the lowest subband of csi-ReportingBand as subband 0.

Table 9 below illustrates a mapping order of CSI fields of a CSI report (CSI part 2 wideband), according to an example implementation of the present disclosure.

TABLE 9

| CSI report number | CSI fields |
|---|---|
| CSI report #n CSI part 2 wideband | Wideband CQI of sub-config#1 for the second TB as in Tables 6.3.1.1.2-3/4/5 as specified in the 3GPP TS 38.212, if present and reported<br>Layer Indicator of sub-config#1 as in Tables 6.3.1.1.2-3/4/5 as specified in the 3GPP TS 38.212, if reported<br>PMI wideband information fields $X_1$ of sub-config#1, from left to right as in Tables 6.3.1.1.2-1/2 or 6.3.2.1.2-1/2 as specified in the 3GPP TS 38.212, if reported<br>PMI wideband information fields $X_2$ of sub-config#1, from left to right as in Tables 6.3.1.1.2-1/2 or 6.3.2.1.2-1/2 as specified in the 3GPP TS 38.212, or codebook index for 2 antenna ports according to the 3GPP TS38.214, if pmi-FormatIndicator = widebandPMI and if reported<br>Wideband CQI of sub-config#2 for the second TB as in Tables 6.3.1.1.2-3/4/5 as specified in the 3GPP TS 38.212, if present and reported<br>Layer Indicator of sub-config#2 as in Tables 6.3.1.1.2-3/4/5 as specified in the 3GPP TS 38.212, if reported<br>PMI wideband information fields $X_1$ of sub-config#2, from left to right as in Tables 6.3.1.1.2-1/2 or 6.3.2.1.2-1/2 as specified in the 3GPP TS 38.212, if reported<br>PMI wideband information fields $X_2$ of sub-config#2, from left to right as in Tables 6.3.1.1.2-1/2 or 6.3.2.1.2-1/2 as specified in the |

TABLE 9-continued

| CSI report number | CSI fields |
|---|---|
| | 3GPP TS 38.212, or codebook index for 2 antenna ports according to the 3GPP TS38.214, if pmi-FormatIndicator = widebandPMI and if reported<br>. . .<br>Wideband CQI of sub-config#N for the second TB as in Tables 6.3.1.1.2-3/4/5 as specified in the 3GPP TS 38.212, if present and reported<br>Layer Indicator of sub-config#N as in Tables 6.3.1.1.2-3/4/5 as specified in the 3GPP TS 38.212, if reported<br>PMI wideband information fields $X_1$ of sub-config#N, from left to right as in Tables 6.3.1.1.2-1/2 or 6.3.2.1.2-1/2 as specified in the 3GPP TS 38.212, if reported<br>PMI wideband information fields $X_2$ of sub-config#N, from left to right as in Tables 6.3.1.1.2-1/2 or 6.3.2.1.2-1/2 as specified in the 3GPP TS 38.212, or codebook index for 2 antenna ports according to the 3GPP TS38.214, if pmi-FormatIndicator = widebandPMI and if reported |

Table 10 below illustrates a mapping order of CSI fields of a CSI report (CSI part 2 subband), according to an example implementation of the present disclosure.

TABLE 10

| | |
|---|---|
| CSI report #n Part 2 subband | Subband differential CQI of sub-config#1 for the second TB of all even subbands with increasing order of subband number, as in Tables 6.3.1.1.2-3/4/5 as specified in the 3GPP TS 38.212, if cqi-FormatIndicator = subbandCQI and if reported<br>PMI subband information fields $X_2$ of sub-config#1 of all even subbands with increasing order of subband number, from left to right as in Tables 6.3.1.1.2-1/2 or 6.3.2.1.2-1/2 as specified in the 3GPP TS 38.212, or codebook index for 2 antenna ports according to the 3GPP TS38.214 of all even subbands with increasing order of subband number, if pmi-FormatIndicator = subbandPMI and if reported<br>Subband differential CQI of sub-config#2 for the second TB of all even subbands with increasing order of subband number, as in Tables 6.3.1.1.2-3/4/5 as specified in the 3GPP TS 38.212, if cqi-FormatIndicator = subbandCQI and if reported<br>PMI subband information fields $X_2$ of sub-config#2 of all even subbands with increasing order of subband number, from left to right as in Tables 6.3.1.1.2-1/2 or 6.3.2.1.2-1/2 as specified in the 3GPP TS 38.212, or codebook index for 2 antenna ports according to the 3GPP TS38.214 of all even subbands with increasing order of subband number, if pmi-FormatIndicator = subbandPMI and if reported<br>. . .<br>Subband differential CQI of sub-config#N for the second TB of all even subbands with increasing order of subband number, as in Tables 6.3.1.1.2-3/4/5 as specified in the 3GPP TS 38.212, if cqi-FormatIndicator = subbandCQI and if reported<br>PMI subband information fields $X_2$ of sub-config#N of all even subbands with increasing order of subband number, from left to right as in Tables 6.3.1.1.2-1/2 or 6.3.2.1.2-1/2 as specified in the 3GPP TS 38.212, or codebook index for 2 antenna ports according to the 3GPP TS38.214 of all even subbands with increasing order of subband number, if pmi-FormatIndicator = subbandPMI and if reported<br>Subband differential CQI of sub-config#1 for the second TB of all odd subbands with increasing order of subband number, as in Tables 6.3.1.1.2-3/4/5 as specified in the 3GPP TS 38.212, if cqi-FormatIndicator = subbandCQI and if reported<br>PMI subband information fields $X_2$ of sub-config#1 of all odd subbands with increasing order of subband number, from left to right as in Tables 6.3.1.1.2-1/2 or 6.3.2.1.2-1/2 as specified in the 3GPP TS 38.212, or codebook index for 2 antenna ports according to the 3GPP TS38.214 of all odd subbands with increasing order of subband number, if pmi-FormatIndicator = subbandPMI and if reported<br>Subband differential CQI of sub-config#2 for the second TB of all odd subbands with increasing order of subband number, as in Tables 6.3.1.1.2-3/4/5 as specified in the 3GPP TS 38.212, if cqi-FormatIndicator = subbandCQI and if reported<br>PMI subband information fields $X_2$ of sub-config#2 of all odd subbands with increasing order of subband number, from left to right |

TABLE 10-continued

| |
|---|
| as in Tables 6.3.1.1.2-1/2 or 6.3.2.1.2-1/2 as specified in the 3GPP TS 38.212, or codebook index for 2 antenna ports according to the 3GPP TS38.214 of all odd subbands with increasing order of subband number, if pmi-FormatIndicator = subbandPMI and if reported |
| . . . |
| Subband differential CQI of sub-config#N for the second TB of all odd subbands with increasing order of subband number, as in Tables 6.3.1.1.2-3/4/5 as specified in the 3GPP TS 38.212, if cqi-FormatIndicator = subbandCQI and if reported |
| PMI subband information fields $X_2$ of sub-config#N of all odd subbands with increasing order of subband number, from left to right as in Tables 6.3.1.1.2-1/2 or 6.3.2.1.2-1/2 as specified in the 3GPP TS 38.212, or codebook index for 2 antenna ports according to the 3GPP TS38.214 of all odd subbands with increasing order of subband number, if pmi-FormatIndicator = subbandPMI and if reported |

Note:
Subbands for given CSI report n indicated by the higher layer parameter csi-ReportingBand are numbered continuously in the increasing order with the lowest subband of csi-ReportingBand as subband 0.

CSI Processing Unit (CPU)

For NES purposes within a multi-CSI framework, the CSI that do not meet the required channel state information (CSI) processing unit (CPU) occupation may be dropped. The total CPU occupancy time (or CPU occupation duration) may be discussed as follows.

A-CSI Reporting on PUSCH

In some implementations, for A-CSI reporting involving multiple sub-configurations, the total CPU occupancy time (or CPU occupation duration) may be defined as starting from the first symbol after the PDCCH triggers the CSI report with N activated sub-configurations, until the last symbol of the scheduled PUSCH carrying the report.

In some implementations, for A-CSI reporting involving a DCI-based triggering, the CPU occupation duration ($O_{CPU}$) may be determined based on N indicated sub-configurations from L configured sub-configurations in a CSI report, and may be determined as follows:

$$O_{CPU}=\sum_{i=1}^{N}K_S^i,$$

where $$K_S^i$$

may be the total number of the CPUs corresponding to the i-th sub-configuration.

In some implementations, for A-CSI reporting involving a DCI-based triggering, the CPU occupation duration ($O_{CPU}$) may be determined based on N indicated sub-configurations from L configured sub-configurations in a CSI report, and may be determined as follows:

$$O_{CPU}=\max_i K_S^i,$$

where $$K_S^i$$

may be the total number of the CPUs corresponding to the i-th sub-configuration.

SP-CSI Reporting on PUSCH

For initial SP-CSI reporting on the PUSCH, the total CPU occupancy time (or CPU occupation duration) may be defined as starting from the first symbol after the PDCCH triggers the CSI report until the last symbol of the scheduled PUSCH carrying the report.

For SP-CSI reporting on the PUSCH (excluding the initial SP-CSI reporting on the PUSCH after the PDCCH triggers the report), the total CPU occupancy time (or CPU occupation duration) may be defined as starting from the first symbol of the earliest one of each CSI-RS, CSI-IM, or SSB resource for channel or interference measurement within N activated sub-configurations, until the last symbol of the configured PUSCH or PUCCH carrying the report.

In some implementations, for SP-CSI reporting involving a DCI-based triggering, the CPU occupation duration ($O_{CPU}$) may be determined based on N indicated sub-configurations from L configured sub-configurations in a CSI report, and may be determined as follows:

$$O_{CPU}=\sum_{i=1}^{N}K_S^i,$$

where $$K_S^i$$

may be the total number of CSI-RS resources corresponding to the i-th sub-configuration.

SP-CSI Reporting on PUCCH

In some implementation, for SP-CSI reporting on the PUCCH, the total CPU occupancy time (or CPU occupation duration) may be defined as starting from the first symbol of the earliest one of each CSI-RS/CSI-IM/SSB resource for channel or interference measurement within L configured sub-configurations, until the last symbol of the configured PUSCH or PUCCH carrying the report.

In some implementation, for SP-CSI reporting on the PUCCH that involves a MAC CE-based triggering, the CPU occupation duration ($O_{CPU}$) may be determined based on L sub-configurations in a CSI report, and may be determined as follows:

$$O_{CPU}=\sum_{i=1}^{L}K_S^i,$$

where $K_S^i$ may be the total number of the CSI-RS resources corresponding to the i-th sub-configuration.

In some implementations, for SP-CSI reporting on the PUCCH that involves a MAC CE-based triggering, the CPU occupation duration ($O_{CPU}$) may be determined based on N sub-configurations from L configured sub-configurations in a CSI report, and may be determined as follows:

$$O_{CPU} = \sum_{i=1}^{N} K_S^i,$$

where $K_S^i$ may be the total number of the CSI-RS resources corresponding to the i-th sub-configuration.

In some implementation, for SP-CSI reporting on the PUCCH that involves a MAC CE-based triggering, the CPU occupation duration ($O_{CPU}$) may be determined based on L sub-configurations in a CSI report, and may be determined as follows:

$$O_{CPU} = \max_i K_S^i,$$

where $K_S^i$ may be the total number of the CSI-RS resources corresponding to the i-th sub-configuration.

CSI Computation Time

When the network requests a CSI report, the UE may not be able to provide the report immediately. The UE may need a certain amount of time to perform the measurement and calculate the result. The CSI computation time for the UE may need to be adjusted, as the multiple sub-configurations in the report may increase the processing load on the UE. When the CSI request field in the DCI triggers a CSI report on the PUSCH, the UE may provide a valid CSI report for the n-th triggered report if the following conditions (a) and (b) are satisfied.

(a) the first uplink symbol carrying the corresponding CSI report, including the effect of the timing advance, begins at or after the symbol $Z_{ref}$, and (b) the first uplink symbol carrying the n-th CSI report, including the effect of the timing advance, begins at or after the symbol $Z'_{ref}(n)$.

The symbol $Z_{re}f$ may be defined as the next uplink symbol with its CP starting $T_{proc,CSI}=(Z)(2048+144)\cdot k2^{-\mu}\cdot T_c+T_{switch}$ after the end of the last symbol of the PDCCH that triggers the CSI report(s). The symbol $Z'_{ref}(n)$ may be defined as the next uplink symbol with its CP starting $T'_{proc,CSI}=(Z')(2048+144)\cdot k2^{-\mu}\cdot T_c$ after the end of the last symbol in time of the latest of: the aperiodic CSI-RS resource for channel measurements, the aperiodic CSI-IM used for interference measurements, and the aperiodic NZP CSI-RS for interference measurements, when the aperiodic CSI-RS is used for channel measurements for the n-th triggered CSI report. $T_{switch}$ may be defined as specified in the 3GPP TS 38.214 and may be applied if a particular parameter (e.g., the Z_1) of Table 5.4-1 as specified in the 3GPP TS 38.214 is applied.

Z, Z' and μ May be Defined as Follows:

$$Z = \max_{m=0,\ldots,M-1}(Z(m))$$

and $$Z' = \max_{m=0,\ldots,M-1}(Z'(m)),$$

where M may be the number of updated CSI reports as specified in the 3GPP TS 38.214, (Z(m), Z'(m)) may correspond to the m-th updated CSI report.

In the following, the definition of Z'(m) under the NES CSI reporting framework is discussed.

In some implementations, Z'(m,j) may be defined per triggered sub-configuration. The aperiodic CSI-RS used for the channel measurements may correspond to the j-th triggered CSI sub-configuration in the m-th report.

In some implementations, Z'(m) may be defined for the m-th triggered CSI report, and the starting time may be the latest of all the AP CSI-RS resources associated with all the sub-configurations in the CSI report, as follows:

$$Z'(m) = \max_{m=0,\ldots,L-1}(Z'(m, j)).$$

In some implementations, Z'(m) may be defined for the m-th triggered CSI report, and the starting time may be the latest of all the AP CSI-RS resources associated with the N triggered sub-configurations in the m-th CSI report, as follows:

$$Z'(m) = \max_{m=0,\ldots,N-1}(Z'(m, j)).$$

The corresponding table that determines the delay requirement and the CSI computation time for the CSI-ReportConfig may be discussed as follows.

Method 0: Table 5.4-1 and Table 5.4-2 as specified in the 3GPP TS 38.214 may be used.

Method 1: The sub-configuration may be considered as the report configuration, and two possible categories may be used.

If (i) the CSI to be transmitted corresponds to the wideband frequency granularity, (ii) each of the N sub-configurations indicates only one resource, and (iii) the number of ports indicated by each of the N sub-configurations is less than 4, the parameters $(Z_1, Z'_1)$ of Table 5.4-2 as specified in the 3GPP TS 38.214 may be used; otherwise, the parameters $(Z_2, Z'_2)$ of Table 5.4-2 as specified in the 3GPP TS 38.214 may be used.

For Type 1 SD adaptation, the number of ports indicated by a sub-configuration may be based on the port subset indicated by the sub-configuration. For Type 2 SD adaptation, the number of CSI-RS resources indicated by a sub-configuration may be based on the CSI-RS ID list indicated by the sub-configuration.

Method 2: The sub-configuration may be considered as the report configuration, and three possible categories may be used.

(a) The parameter $$(Z_1, Z'_1)$$

of Table 5.4-1 as specified in the 3GPP TS 38.214 may be used if max{μPDCCH, μCSI-RS, μUL}≤3 and if the CSI is triggered without a PUSCH with either transport block or HARQ-ACK or both when L=0 CPUs (or the CSI processing resources of the UE) are occupied (e.g., as specified in the 3GPP TS 38.214) and the CSI to be transmitted is a single CSI and corresponds to wideband frequency-granularity where the CSI corresponds to at most 4 CSI-RS port for each resource referred by each of the N sub-configurations without CRI report and where CodebookType is set to 'typeI-SinglePanel' or where reportQuantity is set to 'cri-RI-CQI'.

(b) The parameter $$(Z_1, Z'_1)$$

of Table 5.4-2 as specified in the 3GPP TS 38.214 may be used if the CSI to be transmitted corresponds to the wideband frequency-granularity, where (i) the CSI may correspond to at most 4 CSI-RS ports for each resource indicated by each of N sub-configurations without CRI report, and (ii) the CodebookType may be set to 'typeI-SinglePanel' or the reportQuantity may be set to 'cri-RI-CQI'.

(c) The parameter $$(Z_1, Z'_1)$$

of Table 5.4-2 as specified in the 3GPP TS 38.214 may be used if the CSI to be transmitted corresponds to the wideband frequency-granularity for CSI report corresponding to each of the N sub-configurations, where the reportQuantity may be set to 'ssb-Index-SINR', 'cri-SINR', 'ssb-Index-SINR-Index', or 'cri-SINR-Index'.

(d) The parameter $$(Z_3, Z'_3)$$

of Table 5.4-2 as specified in the 3GPP TS 38.214 for CSI report corresponding to each of N sub-configurations may be used if the reportQuantity is set to 'cri-RSRP', 'ssb-Index-RSRP', 'cri-RSRP-Index', or 'ssb-Index-RSRP-Index', where Xμ may be according to the reported UE capability (e.g., the beamReportTiming) and $KB_1$ may be according to the reported UE capability (e.g., the beamSwitchTiming) as specified in the 3GPP TS 38.306.

(e) The parameter $$(Z_2, Z'_2)$$

of Table 5.4-2 as specified in the 3GPP TS 38.214 may be used if the above-mentioned parameters (e.g., $$(Z_1, Z'_1)$$

and $$(Z_3, Z'_3)$$

in (a)-(d) are not used.

Method 3: Four Possible Categories May be Used.

(a) The parameter $$(Z_1, Z'_1)$$

of Table 5.4-1 as specified in the 3GPP TS 38.214 may be used if max{μPDCCH, μCSI-RS, μUL}≤3 and if the CSI is triggered without a PUSCH with either transport block or HARQ-ACK or both when L=0 CPUs (or the CSI processing resources of the UE) are occupied (e.g., as specified in the 3GPP TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI'.

(b) The parameter $$(Z_1, Z'_1)$$

of Table 5.4-2 as specified in the 3GPP TS 38.214 may be used if the CSI to be transmitted corresponds to the wideband frequency-granularity, where (i) the CSI may correspond to at most 4 CSI-RS ports in a single resource without CRI report, and (ii) the CodebookType may be set to 'typeI-SinglePanel' or the reportQuantity may be set to 'cri-RI-CQI'.

(c) The parameter $$(Z_1, Z_1')$$

of Table 5.4-2 as specified in the 3GPP TS 38.214 may be used if the CSI to be transmitted corresponds to the wideband frequency-granularity, where the reportQuantity may be set to ‘ssb-Index-SINR’, ‘cri-SINR’, ‘ssb-Index-SINR-Index’, or ‘cri-SINR-Index’.

(d) The parameter $$(Z_3, Z_3')$$

of Table 5.4-2 as specified in the 3GPP TS 38.214 may be used if the reportQuantity is set to ‘cri-RSRP’, ‘ssb-Index-RSRP’, ‘cri-RSRP-Index’, or ‘ssb-Index-RSRP-Index’, where $X\mu$ may be according to the reported UE capability (e.g., the beamReportTiming) and $KB_1$ may be according to the reported UE capability (e.g., the beamSwitchTiming) as specified in the 3GPP TS 38.306.

(e) The parameter $$(Z_4, Z_4')$$

of Table 11 as illustrated below may be used if the CSI to be transmitted corresponds to the CSI report with multiple sub-configurations with one resource in the sub-configuration and the number of ports indicated by each of N sub-configurations is less than 4. The actual value of computation time may be the maximum of N computation time. $X\mu'$ may be according to reported new UE capability (e.g., the beamReportTiming) and $KB_1'$ may be according to reported new UE capability (e.g., the beamSwitchTiming).

(f) The parameter $$(Z_2, Z_2')$$

of Table 5.4-2 as specified in the 3GPP TS 38.214 may be used if the above-mentioned parameters (e.g., $$(Z_1, Z_1'), (Z_3, Z_3'), \text{ and } (Z_4, Z_4')$$

in (a)-(e) are not used.

Table 11 below illustrates a table for determining the delay requirement and the CSI computation time for the CSI-ReportConfig, according to an example implementation of the present disclosure.

TABLE 11

| | $Z_1$[symbols] | | $Z_2$ [symbols] | | $Z_3$ [symbols] | | $Z_4$ [symbols] | |
|---|---|---|---|---|---|---|---|---|
| μ | $Z_1$ | $Z'_1$ | $Z_2$ | $Z'_2$ | $Z_3$ | $Z'_3$ | $Z_3$ | $Z'_3$ |
| 0 | 22 | 16 | 40 | 37 | 22 | $X_0$ | 40 | 37 |
| 1 | 33 | 30 | 72 | 69 | 33 | $X_1$ | 72 | 69 |
| 2 | 44 | 42 | 141 | 140 | min(44, $X_2$ + $KB_1$) | $X_2$ | 141 | max(140, $X_2'$ + $KB_{1'}$) |
| 3 | 97 | 85 | 152 | 140 | min(97, $X_3$ + $KB_2$) | $X_3$ | 152 | max(140, $X_3'$ + $KB_2$) |
| 5 | 388 | 340 | 608 | 560 | min(388, X5 + KB3) | X5 | 608 | max(560, X5' + KB3') |
| 6 | 776 | 680 | 1216 | 1120 | min(776, X6 + KB4) | X6 | 1216 | max(1120, X6' + KB4') |

Method 5: UE Capability Reporting 1

A new UE capability (e.g. the computationTimeForA-CSI-r18-NES) may indicate the CSI computation time for A-CSI reporting in NES applications. If ‘relaxed’ is reported, a particular IE (e.g., the additionalSymbols-r18) may also be reported to indicate, for each supported SCS, the required additional number of symbols in addition to existing Z and Z' for CSI reporting involving multiple sub-configurations.

Method 6: UE Capability Reporting 2

A new UE capability (e.g., the computationTimeForA-CSI-r18-NES) may indicate the CSI computation time for A-CSI reporting in NES applications. If ‘relaxed’ is reported, a particular IE (e.g., the multipledSymbols-r18) may also be reported to indicate, for each supported SCS, the required additional multiplication to the number of existing Z and Z' for CSI reporting involving multiple sub-configurations. The result of the multiplication may be rounded up to the nearest whole number.

CSI-IM for NES Applications

The CSI-IM resource may be configured/indicated by a set of specific IEs reserved for interference measurements, as defined in Table 12 to Table 15. These IEs may be configured via an RRC message. The frequency and time domain locations may be defined as specified in the 3GPP TS 38.214.

Table 12 below illustrates information of the CSI-AssociatedReportConfiginfo IE, according to an example implementation of the present disclosure.

TABLE 12

```
CSI-AssociatedReportConfiginfo ::= SEQUENCE (
   reportConfigId CSI-ReportConfigId,
   resourcesForChannel CHOICE {
      nzp-CSI-RS SEQUENCE {
         resourceSet INTEGER (1..maxNrofNZP-CSI-RS-ResourceSetsPerConfig),
         qcl-info SEQUENCE (SIZE (1..maxNrofAP-CSI-RS-ResourcesPerSet)) OF
TCI-StateId
      } OPTIONAL -- Cond Aperiodic
      csi-SSB-ResourceSet INTEGER (1..maxNrofCSI-SSB-
ResourceSetsPerConfig),
   },
   csi-IM-ResourcesForInterference INTEGER (1..maxNrofCSI-IM-
ResourceSetsPerConfig) OPTIONAL, -- Cond CSI-IM-ForInterference
   nzp-CSI-RS-ResourcesForInterference INTEGER (1..maxNrofNZP-CSI-RS-
ResourceSetsPerConfig) OPTIONAL -- Cond NZP-CSI-RS-ForInterference
...,
[[
resourcesForChannel2-r17 CHOICE {
   nzp-CSI-RS2-r17 SEQUENCE {
      resourceSet2-r17 INTEGER (1..maxNrofNZP-CSI-RS-
ResourceSetsPerConfig),
      qcl-info2-r17 SEQUENCE (SIZE (1..maxNrofAP-CSI-RS-ResourcesPerSet))
OF TCI-StateId
      OPTIONAL -- Cond Aperiodic,
},
   csi-SSB-ResourceSet2-r17 INTEGER (1..maxNrofCSI-SSB-
ResourceSetsPerConfigExt)
} OPTIONAL -- Cond NoUnifiedTCI
   csi-SSB-ResourceSetExt INTEGER (1..maxNrofCSI-SSB-
ResourceSetsPerConfigExt) OPTIONAL -- Need R
]]
}
-- TAG-CSI-APERIODICTRIGGERSTATELIST-STOP
-- ASN1STOP
```

Table 13 below illustrates information of the CSI-IM-Resource IE, according to an example implementation of the present disclosure.

TABLE 13

```
CSI-IM-Resource information element
-- ASN1START
-- TAG-CSI-IM-RESOURCE-START
CSI-IM-Resource ::= SEQUENCE {
   csi-IM-ResourceId CSI-IM-ResourceId,
   csi-IM-ResourceElementPattern CHOICE {
      pattern0 SEQUENCE {
         subcarrierLocation-p0, ENUMERATED { s0, s2, s4, s6, s8, s10 },
         symbolLocation-p0 INTEGER (0..12)
      },
      pattern1 SEQUENCE {
         subcarrierLocation-p1, ENUMERATED { s0, s4, s8 },
         symbolLocation-p1 INTEGER (0..13)
      }
   }                                          -- Need M
   freqBand CSI-FrequencyOccupation OPTIONAL, -- Need M
   periodicityAndOffset CSI-ResourcePeriodicityAndOffset OPTIONAL, -- Cond
PeriodicOrSemiPersistent
   ...
-- TAG- CSI-IM-RESOURCE -STOP
-- ASN1STOP
```

Table 14 below illustrates information of the CSI-IM-ResourceSet IE, according to an example implementation of the present disclosure.

TABLE 14

```
CSI-IM-ResourceSet information element
-- ASN1START
-- TAG-CSI-IM-RESOURCESET-START
CSI-IM-ResourceSet ::= SEQUENCE {
  csi-IM-ResourceSetId CSI-IM-ResourceId,
  csi-IM-Resources SEQUENCE (SIZE (1..maxNrofCSI-IM-ResourcesPerSet))
OF CSI-IM-ResourceId,
...
}
-- TAG-CSI-IM-RESOURCESET-STOP
-- ASN1STOP
```

Table 15 below illustrates information of the CSI-ResourceConfig 1E, according to an example implementation of the present disclosure.

TABLE 15

```
CSI-ResourceConfig information element
-- ASN1START
-- TAG-CSI-RESOURCECONFIG-START
CSI-ResourceConfig ::= SEQUENCE {
  csi-ResourceConfigId CSI-ResourceConfigId,
  csi-RS-ResourceSetList CHOICE {
    nzp-CSI-RS-SSB SEQUENCE {
      nzp-CSI-RS-ResourceSetList SEQUENCE (SIZE (1..maxNrofNZP-CSI-
RS-ResourceSetsPerConfig)) OF NZP-CSI-RS-ResourceSetId
                                    OPTIONAL, -- Need R
      csi-SSB-ResourceSetList SEQUENCE (SIZE (1..maxNrofCSI-SSB-
ResourceSetsPerConfig)) OF CSI-SSB-ResourceSetId OPTIONAL -- Need R
    },
    csi-IM-ResourceSetList SEQUENCE (SIZE (1..maxNrofCSI-IM-
ResourceSetsPerConfig)) OF CSI-IM-ResourceSetId
  },
  bwp-Id BWP-Id,
  resourceType ENUMERATED { aperiodic, semiPersistent, periodic },
  ...
  csi-SSB-ResourceSetListExt-r17 CSI-SSB-ResourceSetId OPTIONAL -- Need R
  ]]
}
-- TAG-CSI- RESOURCECONFIG -STOP
-- ASN1STOP
```

For legacy configurations, there may be a CSI-IM resource set configuration for the CSI-AssociateReportConfigInfo. For SD adaptation and/or PD adaptation, when a resource is associated with L sub-configurations, some methods may be used to indicate the association between the CSI-RS resource and the CSI-IM resource.

Method 1: The resource may be allocated in a resource-wise manner. The resource and an NZP CSI-RS resource for IM or CSI-IM may be quasi-co-located.

For Type 1 adaptation, the CSI-IM or the NZP CSI resource for IM may be configured in a resource-wise manner. The UE may determine the CSI-IM resource for interference measurements based on the association between the CSI-RS resource and the CSI-IM resource in the corresponding resource set. In some implementations, the resources determined from the NZP CSI-RS resource, based on the port subset indications, may share the same associated CSI-IM resource. The common NZP CSI-RS resource for interference measurements may be applied to all sub-configurations. In some implementations, the scaling of the same CSI-IM for different sub-configurations may be associated with the NZP CSI-RS resource for measurements in each sub-configuration.

For Type 2 adaptation, a list of CSI-IM resource IDs may be configured within a CSI report sub-configuration. In some implementations, there may be one resource set for interference measurements used by L sub-configurations. The number of resources within the resource set for interference measurements may be equal to the total number of resources for channel measurements indicated by each of L sub-configurations in the CSI-ReportConfig.

Method 2: The resource may be associated with and quasi-co-located with L NZP CSI-RS resources for IMs or CSI-IMs.

Because the resource is configured with L sub-configurations, the UE may use these associations from each sub-configuration to determine the CSI-IM and the QCL information. For example, in sub-configuration #1, the associated CSI-IM for the CSI-RS resource may be CSI-IM #1, while in sub-configuration #L, the associated CSI-IM for the same CSI-RS resource may be CSI-IM #L.

CSI Reference Resource

Method 1: The $n_{CSI\_ref}$ may be determined based on the CSI report configuration.

If the CSI report configuration (e.g., the CSI-ReportConfig) includes multiple sub-configurations and the report configuration type (e.g., the reportConfigType) is set to the periodic or semi-persistent CSI reporting, the $n_{CSI\_ref}$ may be determined as follows.

If the number of CSI-RS resources indicated by a triggered CSI report sub-configurations is one, the $n_{CSI\_ref}$ corresponding to the CSI-ReportConfig may be the smallest value greater than or equal to $4 \cdot 2^{\mu_{DL}}$, such that the $n_{CSI\_ref}$ may correspond to a valid downlink slot.

If the number of CSI-RS resources indicated by each triggered CSI report sub-configurations is more than one, the $n_{CSI\_ref}$ corresponding to the CSI-ReportConfig may be the smallest value greater than or equal to $5 \cdot 2^{\mu_{DL}}$, such that the $n_{CSI\_ref}$ may correspond to a valid downlink slot.

For Type 2 SD adaptation, the number of CSI-RS resources indicated by a sub-configuration may be based on the CSI-RS ID list indicated in the sub-configuration.

Method 2: The $n_{CSI\_ref}$ may be determined per sub-configuration.

If the CSI-ReportConfig includes multiple sub-configurations and the reportConfigType of the sub-configuration is set to the periodic or semi-persistent CSI reporting, the $n_{CSI\_ref}$ may be determined as follows.

If a single CSI-RS resource is configured for channel measurements in a sub-configuration, the $n_{CSI\_ref}$ may be the smallest value greater than or equal to $4 \cdot 2^{\mu_{DL}}$, such that the $n_{CSI\_ref}$ may correspond to a valid downlink slot per sub-configuration.

If multiple single CSI-RS resources are configured for channel measurements in a sub-configuration, the $n_{CSI\_ref}$ may be the smallest value greater than or equal to $5 \cdot 2^{\mu_{DL}}$, such that the $n_{CSI\_ref}$ may correspond to a valid downlink slot per sub-configuration.

In some implementations, if a CSI-RS resource is identified before the $n_{CSI\_ref}$ in a sub-configuration, the CSI-RS resource may be determined to be present in the CSI derivation for that sub-configuration. If the same CSI-RS resource is identified after the $n_{CSI\_ref}$ in another sub-configuration, the CSI-RS resource may be determined to be absent in the CSI derivation for that sub-configuration.

In some implementation, if a CSI-RS resource is identified before the $n_{CSI\_ref}$ in a sub-configuration and after the $n_{CSI\_ref}$ in another sub-configuration, the CSI-RS resource may not be determined to be present in the CSI derivation at all.

Dropping of CSI Report

If the measurement restriction is configured, the UE may use the latest occurrence of the CSI-RS/IM for channel/interference measurements when deriving the CSI. If the measurement restriction is not configured, the UE may perform averaging to improve the channel/interference estimation performances.

In some implementations, when no single transmission occasion corresponding to a sub-configuration meets the CSI reference resource time requirement, the entire CSI report may be dropped.

In some implementations, when no single transmission occasion corresponding to a sub-configuration meets the CSI reference resource time requirement, the CSI corresponding to the sub-configuration may be dropped, while some CSI reports may still need to be retransmitted.

UE Capability

In the following, the spatial patterns and sub-configurations are discussed.

A particular IE (e.g., maxNumberAperiodicCSI-PerBWP-ForCSI-Report) as specified in the 3GPP TS.38.306 may indicate the maximum number of aperiodic CSI reports per (DL/UL/SL) BWP. The candidate values may be {1, 2, 3, 4}. The value may not be sufficient to support multiple CSI reports for NES spatial adaptation.

For A-CSI, the maximum number of sub-configurations per trigger state may be 8/16/32. For P-CSI/SP-CSI reporting on the PUCCH, the maximum number of sub-configurations may be less than two, allowing NES to support multi-CSI reporting via single CSI report configuration. For serving cell capacity, there may be a limit of a maximum of 8, 16, 24, 32, or 64 spatial adaptation patterns per cell.

In the following, the total number of CSI-RS resources is discussed.

Regarding the restriction on the total number of CSI-RS resources M for channel measurements in the CSI-ReportConfig, a particular IE (e.g., the maxNumberSSB-CSIRS-res-r16) may be used to indicate the maximum number of SSB/CSI-RS resources across all CCs within a band for channel measurement reports. The candidate values may be {n8, n16, n32, n64, n128}. A particular IE (e.g., the maxNumberCSI-IM-NZP-IMR-res-mem-r16) may indicate the maximum number of CSI-IM/NZP-IMR resources across all CCs within a band, with the candidate values being {n8, n16, n32, n64, n128}.

In some implementations, for Type 1 SD adaptation, the restriction may be applied independently of the number of sub-configurations, as M≥1 with each CSI-RS resource being associated with all sub-configurations. The restriction maxNumberSSB-CSIRS-res-r16 may be expanded to a higher value.

In some implementations, for Type 2 SD adaptation, the restriction may depend on the number of sub-configurations L, as there may be at least one CSI-RS resource per sub-configuration. Therefore, M≥L, and the total number of resources may be expressed as $$M = \sum_{i=1}^{L} Mi,$$

where Mi may be the number of resources in the sub-configuration i. The restriction maxNumberSSB-CSIRS-res-r16 may be expanded to a higher value, as the overall report number may be larger than before. The maximum value of M may be limited by the UE capability.

Multiplexing

The UCI messages may include the HARQ-ACK, the CSI, and the SR. The UCI messages may be encoded and transmitted through the PUCCH or may be multiplexed on the PUSCH. The CSI reporting of multiple sub-configurations may be aperiodic (e.g., using the PUSCH), periodic (e.g., using the PUCCH), or semi-persistent (e.g., using the PUCCH or DCI-activated PUSCH).

The CSI report may include two parts (e.g., the CSI part 1 and the CSI part 2). The CSI part 1 may include a fixed payload size and may be used to identify the number of bits in the CSI part 2. The CSI part 1 may be transmitted completely before the transmission of the CSI part 2. The HARQ-ACK (if any) and CSI (if any) may be encoded and multiplexed with the encoded UL-SCH data, and then may be transmitted on the PUSCH. In some implementations, the HARQ-ACK (if any) and CSI (if any) may be encoded and multiplexed without the encoded UL-SCH data, and then may be transmitted on the PUSCH.

The CSI reporting of multiple sub-configurations may include a larger payload size than the legacy CSI reporting. The rate matching of the multiplexing may need to be updated, as specified in the 3GPP TS 38.213 and the 3GPP TS 38.212. The Beta offset for the CSI-Part 1 and the CSI part 2 may be discussed as follows.

The multiplexing of the CSI part 1 may be based on the follows:

$$Q'_{CSI-1} = \min\left\{\left\lceil \frac{(O_{CSI-1}+L_{CSI-1})\cdot\beta_{offset}^{PUSCH}\cdot\sum_{l=0}^{N_{symb,all}^{PUSCH}-1} M_{SC}^{UCI}(l)}{\sum_{r=0}^{C_{UL-SCH}-1} K_r}\right\rceil, \left\lceil \alpha\cdot\sum_{l=0}^{N_{symb,all}^{PUSCH}-1} M_{SC}^{UCI}(l)\right\rceil - Q'_{ACK}\right\},$$

as specified in the 3GPP TS 38.212.

The multiplexing of the CSI part 2 may be based on the follows:

$$Q'_{CSI-2} = \min\left\{\left\lceil \frac{(O_{CSI-2}+L_{CSI-2})\cdot\beta_{offset}^{PUSCH}\cdot\sum_{l=0}^{N_{symb,all}^{PUSCH}-1} M_{SC}^{UCI}(l)}{\sum_{r=0}^{C_{UL-SCH}-1} K_r}\right\rceil, \left\lceil \alpha\cdot\sum_{l=0}^{N_{symb,all}^{PUSCH}-1} M_{SC}^{UCI}(l)\right\rceil - Q'_{ACK} - Q'_{CSI-1}\right\},$$

as specified in the 3GPP TS 38.212.

The table in the 3GPP TS (e.g., Table 9.3-2 in the 3GPP TS 38.213) may need to be updated to meet the requirements of CSI reporting involving multiple sub-configurations. These updates may involve modifications to ensure compatibility with the increased complexity and size of CSI report in the context of multiple sub-configurations.

Method 1: Table Updating

The value of Beta offset may be updated based on the following rule: the difference between the values of Beta offset may follow a similar arithmetic series. If two tables coexist, the network may need to further indicate to the UE which table is used.

Table 16 below illustrates Beta offset values for CSI reporting, according to an example implementation of the present disclosure.

TABLE 16

| Original Table $I^{csi}_{offset}$ | $Beta^{csi}_{offset}$ | Updated Table $I^{csi}_{offset}$ | $Beta^{csi}_{offset}$ |
|---|---|---|---|
| 0 | 1.125 | 0 | 1.125 |
| 1 | 1.250 | 1 | 1.375 |
| 2 | 1.375 | 2 | 1.750 |
| 3 | 1.625 | 3 | 2.000 |
| 4 | 1.750 | 4 | 2.25 |
| 5 | 2.000 | 5 | 2.875 |
| 6 | 2.250 | 6 | 3.5 |
| 7 | 2.500 | 7 | 4.000 |
| 8 | 2.875 | 8 | 6.25 |
| 9 | 3.125 | 9 | 8 |
| 10 | 3.500 | 10 | 10 |
| 11 | 4.000 | 11 | 12.625 |
| 12 | 5.000 | 12 | 15.875 |
| 13 | 6.250 | 13 | 20 |
| 14 | 8.000 | 14 | 25 |
| 15 | 10.000 | 15 | 30.5 |
| 16 | 12.625 | 16 | 36.5 |
| 17 | 15.875 | 17 | 42.75 |
| 18 | 20.000 | 18 | 49 |

Method 2: Reserved Field Updating

The reserved part of the table in the 3GPP TS (e.g., Table 9.3-2 in the 3GPP TS 38.212) may be updated for NES applications. The mapping of the Beta offset value for CSI reporting and the index may be configured by higher layers.

For example, the reserved field for $I^{csi}_{offset}$ from 19 to 24 may include the following (a)-(f):

(a) For $I^{csi}_{offset}$=19, $Beta^{csi}_{offset}$=25

(b) For $I^{csi}_{offset}$=20, $Beta^{csi}_{offset}$=30.5

(c) For $I^{csi}_{offset}$=21, $Beta^{csi}_{offset}$=36.5

(d) For $I^{csi}_{offset}$=22, $Beta^{csi}_{offset}$=42.75

(e) For $I^{csi}_{offset}$=23, $Beta^{csi}_{offset}$=49

(f) For $I^{csi}_{offset}$=24, $Beta^{csi}_{offset}$=55.25

The usage of the reserved part may expand the PUSCH utilization when CSI is reported with multiple sub-configurations, potentially lowering the possibility of CSI being dropped.

Multiple PUCCH Resources for Multiple CSI Reports

The PUCCH resources for P-CSI/SP CSI may not be sufficient for CSI reporting involving multiple sub-configurations. Even if the CSI dropping rule is updated to the sub-configuration level, retransmission of the dropped CSI may still be necessary. Furthermore, the retransmitted CSI may become outdated due to delays. The NW may configure a list of PUCCH resources corresponding to different sets of sub-configurations. There may be challenges in determining which type of CSI is allocated to the first PUCCH resource and which type is allocated to the following PUCCH resources.

In some implementations, the CSI part 1 may be included in the first PUCCH resource, and the CSI part 2 may be included in the subsequent PUCCH resources. In some implementations, the CSI of the preceding sub-configurations may be included in the first PUCCH resource, and the CSI of subsequent sub-configurations may be included in the subsequent PUCCH resources. In some implementations, the updated CSI mapping rule for multiple PUCCH resources may follow the agreement of RAN1 R18 meeting.

There may be issues related to CSI resource allocation (e.g., the frequency, time, format, CP-OFDM, DFT-OFDM) for the first PUCCH resource and the subsequent PUCCH resources. For example, the periodic CSI reporting on PUCCH format 2, 3, and/or 4 may support Type 1 CSI feedback with the wideband granularity. The CSI reporting on PUCCH format 3 and/or 4 may support Type 1 CSI feedback with the subband granularity, with CSI part 1 and CSI part 2 together. Support for PUCCH format 3 and format 4 for Type 2 CSI feedback may be part of the UE capability (e.g., the type2-SP-CSI-Feedback-LongPUCCI). The SP-CSI report on PUCCH format 3 and format 4 may support Type 2 CSI feedback, but only CSI part 1 of CSI feedback is included.

In some implementations, the first PUCCH resource and the following PUCCH resources may have the same resource allocation. For example, the PUCCH format of the first resource may be the format 2, with the codebook type of sub-configuration #1 in the first PUCCH resource as Type 1 Single Panel, and the PUCCH format of the second resource may also be the format 2, with the codebook type of sub-configuration #2 in the second PUCCH resource as Type 1 Multi Panel.

In some implementations, the first PUCCH resource and the following PUCCH resources may have different resource allocations. If different resource allocations are possible, a combination of different types of CSI codebook reports for different sub-configurations may be implemented. For example, the PUCCH format of the first resource may be the format 2, with the codebook type of sub-configuration #1 as Type 1 Single Panel, and the PUCCH format of the second resource may be the format 3, with the codebook type of sub-configuration #2 as Type 2 Single Panel.

The number of PUCCH resources may be determined by the following methods 1-3.

Method 1

The number of PUCCH resources may be determined based on the number of activated sub-configurations. The activation may be RRC-configured for P-CSI reporting and SP-CSI reporting on PUCCH. The activation may be MAC CE/DCI-configured for A-CSI reporting and SP-CSI reporting on PUSCH.

Method 2

The number of PUCCH resource may be determined based on the CSI payload corresponding to all activated sub-configurations. Different formats of PUCCH may have different payload capacities. There may be a predefined table for determining the boundary CSI payload bits for selecting multiple PUCCH resources.

Method 3

The number of PUCCH resources may be explicitly indicated based on additional RRC/MAC CE signaling.

Figure 5:
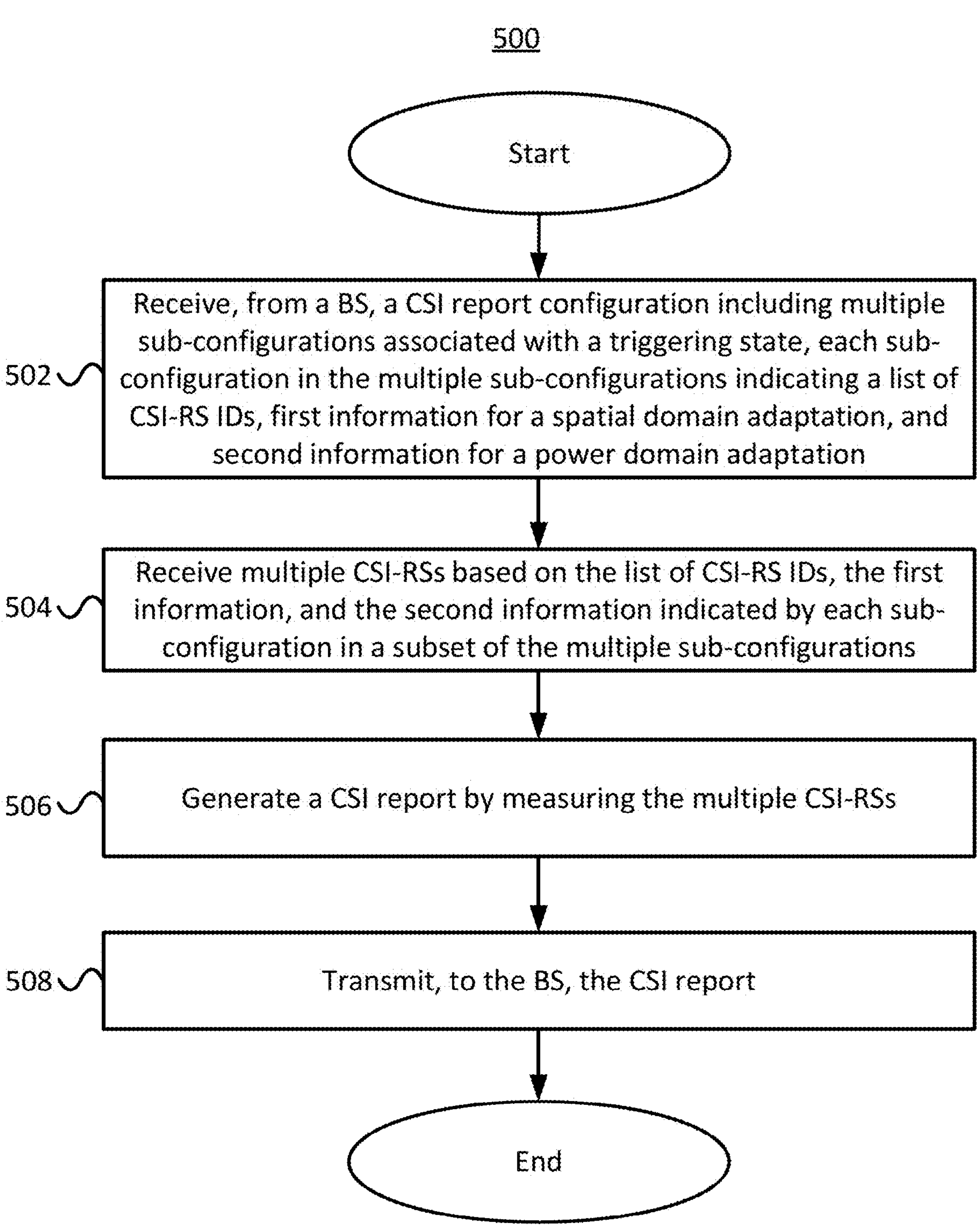
FIG. 5 is a flowchart illustrating a method/process performed by a UE for NES, according to an example implementation of the present disclosure.

FIG. 5 is a flowchart illustrating a method/process 500 performed by a UE for NES, according to an example implementation of the present disclosure.

In the action 502, the process 500 may start by receiving, from a BS, a channel state information (CSI) report configuration including multiple sub-configurations associated with a triggering state. Each sub-configuration in the multiple sub-configurations may indicate a list of channel state information (CSI)-reference signal (RS) identifiers (IDs), first information for a spatial domain adaptation, and second information for a power domain adaptation. The triggering state may be associated with aperiodic CSI reporting or semi-persistent CSI reporting.

In some implementations, the first information may include an antenna port configuration associated with the list of CSI-RS IDs. In some implementations, the second information may include a power offset value associated with the list of CSI-RS IDs.

In the action 504, the process 500 may receive multiple CSI-RSs based on the list of CSI-RS IDs, the first information, and the second information indicated by each sub-configuration in a subset of the multiple sub-configurations.

In some implementations, in a case that the triggering state is associated with the aperiodic CSI reporting, the subset of the multiple sub-configurations may be activated and indicated based, respectively, on a medium access control (MAC) control element (CE) and downlink control information (DCI) received from the BS. In some implementations, in a case that the triggering state is associated with the semi-persistent CSI reporting, the subset of the multiple sub-configurations may be activated based on a medium access control (MAC) control element (CE) received from the BS.

In action 506, the process 500 may generate a CSI report by measuring the multiple CSI-RSs.

In action 508, the process 500 may transmit, to the BS, the CSI report. The process 500 may then end. In some implementations, the CSI report may include at least one of a channel quality indicator (CQI), a precoding matrix indicator (PMI), a CSI-RS resource indicator (CRI), a synchronization signal/physical broadcast channel block resource indicator (SSBRI), a layer indicator (LI), a rank indicator (RI), and a layer 1 (L1)-reference signal received power (RSRP).

The steps/actions shown in FIG. 5 should not be construed as necessarily order dependent. The order in which the process is described is not intended to be construed as a limitation. Moreover, some of the actions shown in FIG. 5 may be omitted in some implementations and one or more actions shown in FIG. 5 may be combined.

The technical problem addressed by the method illustrated in FIG. 5 is how to improve network energy efficiency in 5G systems while handling the increasing complexity of CSI reporting. Traditional CSI reporting methods may not be efficient for scenarios involving multiple sub-configurations, resulting in unnecessary energy consumption at both the UE and the BS. By introducing a method where the UE efficiently handles CSI reporting using multiple sub-configurations, each specifying spatial domain and power domain adaptations. This enables the UE to selectively receive and measure CSI-RSs based on specific configurations, thereby reducing unnecessary signal processing and energy use. Furthermore, associating the triggering state with aperiodic or semi-persistent CSI reporting further optimizes the reporting process, ensuring that the UE only transmits relevant data when necessary, contributing to significant energy savings in the network.

Figure 6:
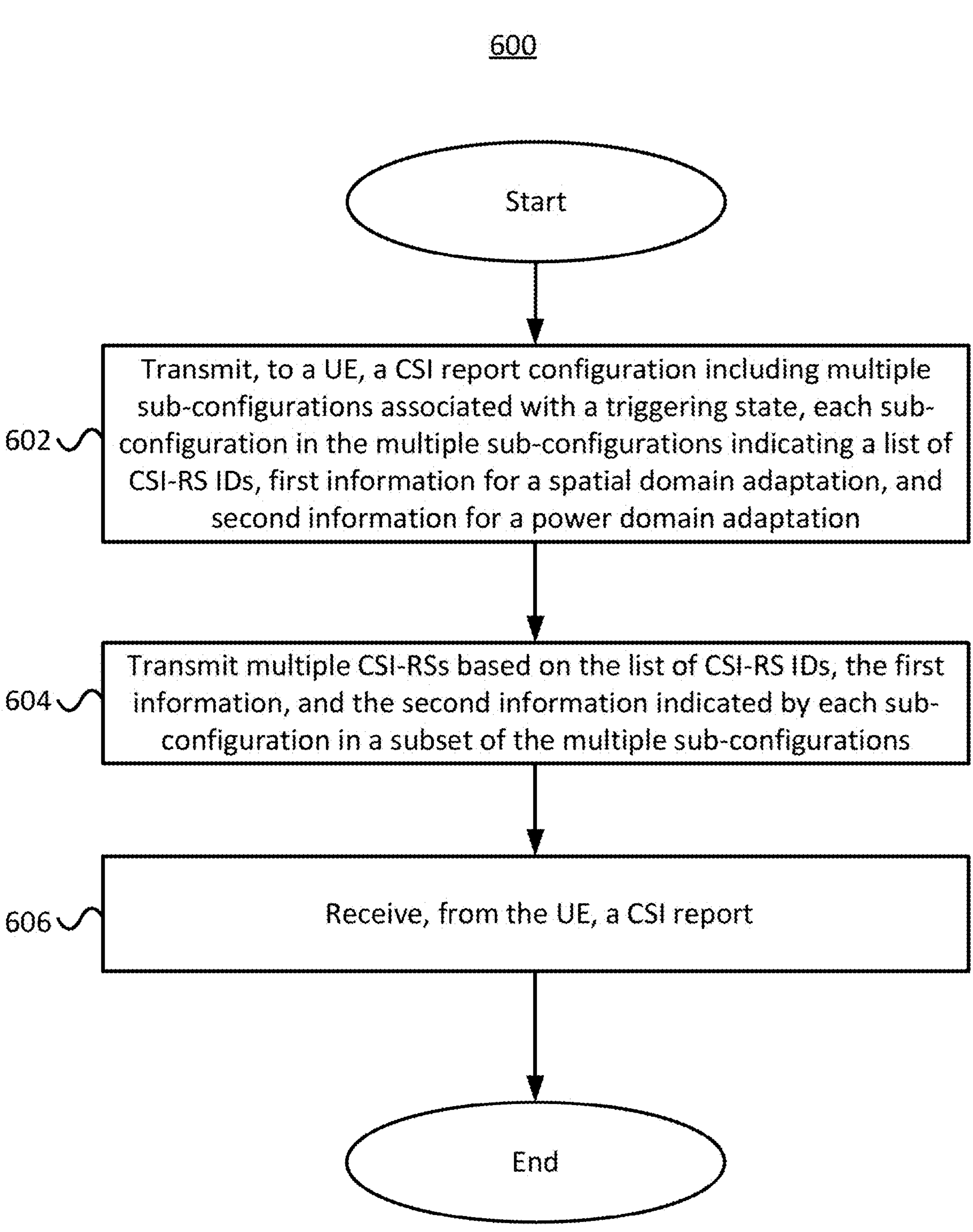
FIG. 6 is a flowchart illustrating a method/process performed by a BS for NES, according to an example implementation of the present disclosure.

FIG. 6 is a flowchart illustrating a method/process 600 performed by a BS for NES, according to an example implementation of the present disclosure.

In the action 602, the process 600 may start by transmitting, to a UE, a channel state information (CSI) report configuration including multiple sub-configurations associated with a triggering state. Each sub-configuration in the multiple sub-configurations may indicate a list of channel state information (CSI)-reference signal (RS) identifiers (IDs), first information for a spatial domain adaptation, and second information for a power domain adaptation. The triggering state may be associated with aperiodic CSI reporting or semi-persistent CSI reporting.

In some implementations, the first information may include an antenna port configuration associated with the list of CSI-RS IDs. In some implementations, the second information may include a power offset value associated with the list of CSI-RS IDs.

In the action 604, the process 600 may transmit multiple CSI-RSs based on the list of CSI-RS IDs, the first information, and the second information indicated by each sub-configuration in a subset of the multiple sub-configurations.

In some implementations, in a case that the triggering state is associated with the aperiodic CSI reporting, the subset of the multiple sub-configurations may be activated and indicated based, respectively, on a medium access control (MAC) control element (CE) and downlink control information (DCI) transmitted to the UE. In some implementations, in a case that the triggering state is associated with the semi-persistent CSI reporting, the subset of the multiple sub-configurations may be activated based on a medium access control (MAC) control element (CE) transmitted to the UE.

In action 606, the process 600 may receive, from the UE, a CSI report. The CSI report may be generated by measuring the multiple CSI-RSs. The process 600 may then end. In some implementations, the CSI report may include at least one of a channel quality indicator (CQI), a precoding matrix indicator (PMI), a CSI-RS resource indicator (CRI), a synchronization signal/physical broadcast channel block resource indicator (SSBRI), a layer indicator (LI), a rank indicator (RI), and a layer 1 (L1)-reference signal received power (RSRP).

The method illustrated in FIG. 6 is similar to that in FIG. 5, except that it is described from the perspective of the BS (instead of the UE).

The steps/actions shown in FIG. 6 should not be construed as necessarily order dependent. The order in which the process is described is not intended to be construed as a limitation. Moreover, some of the actions shown in FIG. 6 may be omitted in some implementations and one or more actions shown in FIG. 6 may be combined.

Figure 7:
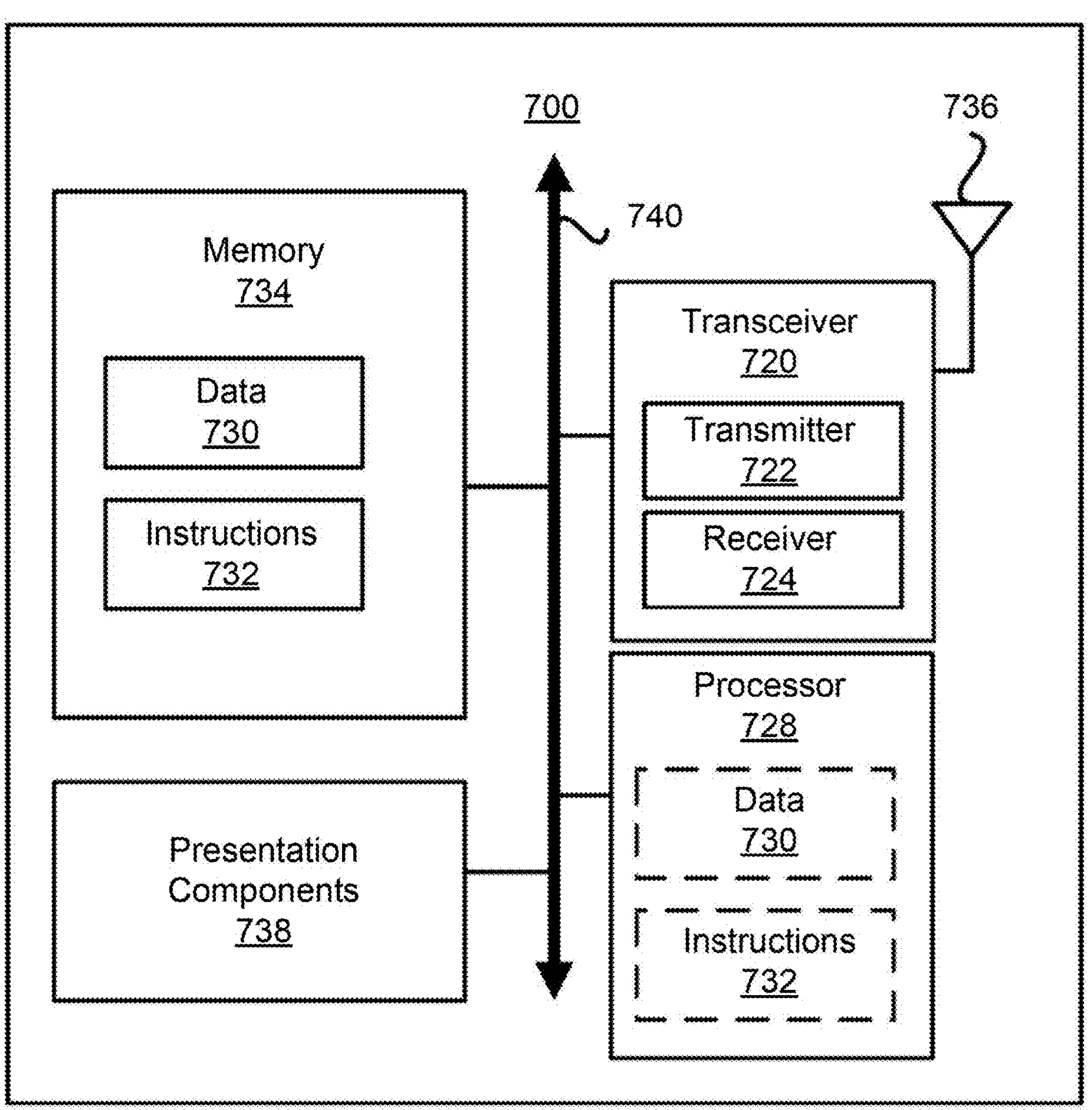
FIG. 7 is a block diagram illustrating a node for wireless communication, according to an example implementation of the present disclosure.

FIG. 7 is a block diagram illustrating a node 700 for wireless communication, according to an example implementation of the present disclosure. As illustrated in FIG. 7, a node 700 may include a transceiver 720, a processor 728, a memory 734, one or more presentation components 738, and at least one antenna 736. The node 700 may also include a radio frequency (RF) spectrum band module, a BS communications module, a network communications module, and a system communications management module, Input/Output (I/O) ports, I/O components, and a power supply (not illustrated in FIG. 7). FIG. 7 is a block diagram illustrating a node for wireless communication, according to an example implementation of the present disclosure.

Each of the components may directly or indirectly communicate with each other over one or more buses 740. The node 700 may be a UE or a BS that performs various functions disclosed with reference to FIGS. 5 and 6.

The transceiver 720 has a transmitter 722 (e.g., transmitting/transmission circuitry) and a receiver 724 (e.g., receiving/reception circuitry) and may be configured to transmit and/or receive time and/or frequency resource partitioning information. The transceiver 720 may be configured to transmit in different types of subframes and slots including, but not limited to, usable, non-usable, and flexibly usable subframes and slot formats. The transceiver 720 may be configured to receive data and control channels.

The node 700 may include a variety of computer-readable media. Computer-readable media may be any available media that may be accessed by the node 700 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules, or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules, or other data in a modulated data signal, such as a carrier wave, or other transport mechanisms and include any information delivery media.

The term "modulated data signal" may mean a signal that has one or more of its characteristics set or changed in such a manner as to encode information in the signal. Communication media may include wired media, such as a wired network or direct-wired connection, and wireless media, such as acoustic, RF, infrared, and other wireless media. Combinations of any of the above listed components should also be included within the scope of computer-readable media.

The memory 734 may include computer-storage media in the form of volatile and/or non-volatile memory. The memory 734 may be removable, non-removable, or a combination thereof. Example memory may include solid-state memory, hard drives, optical-disc drives, etc. As illustrated in FIG. 7, the memory 734 may store a computer-readable and/or computer-executable instructions 732 (e.g., software codes) that are configured to, when executed, cause the processor 728 to perform various functions disclosed herein, for example, with reference to FIGS. 5 and 6. Alternatively, the instructions 732 may not be directly executable by the processor 728 but may be configured to cause the node 700 (e.g., when compiled and executed) to perform various functions disclosed herein.

The processor 728 (e.g., having processing circuitry) may include an intelligent hardware device, e.g., a Central Processing Unit (CPU), a microcontroller, an ASIC, etc. The processor 728 may include memory. The processor 728 may process the data 730 and the instructions 732 received from the memory 734, and information transmitted and received via the transceiver 720, the baseband communications module, and/or the network communications module. The processor 728 may also process information to send to the transceiver 720 for transmission via the antenna 736 to the network communications module for transmission to a CN.

One or more presentation components 738 may present data indications to a person or another device. Examples of presentation components 738 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method performed by a user equipment (UE) for network energy saving (NES), the method comprising:

receiving, from a base station (BS), a channel state information (CSI) report configuration comprising a plurality of sub-configurations associated with a triggering state, each sub-configuration in the plurality of sub-configurations indicating a list of channel state information (CSI)-reference signal (RS) identifiers (IDs), first information for a spatial domain adaptation, and second information for a power domain adaptation;

receiving a plurality of CSI-RSs based on the list of CSI-RS IDs, the first information, and the second information indicated by each sub-configuration in a subset of the plurality of sub-configurations;

generating a CSI report by measuring the plurality of CSI-RSs; and transmitting, to the BS, the CSI report, wherein the triggering state is associated with aperiodic CSI reporting or semi-persistent CSI reporting.

2. The method of claim 1, wherein the CSI report comprises at least one of a channel quality indicator (CQI), a precoding matrix indicator (PMI), a CSI-RS resource indicator (CRI), a synchronization signal/physical broadcast channel block resource indicator (SSBRI), a layer indicator (LI), a rank indicator (RI), and a layer 1 (L1)-reference signal received power (RSRP).

3. The method of claim 1, wherein, in a case that the triggering state is associated with the aperiodic CSI reporting, the subset of the plurality of sub-configurations is activated by a medium access control (MAC) control element (CE) received from the BS, and indicated by downlink control information (DCI) received from the BS.

4. The method of claim 1, wherein, in a case that the triggering state is associated with the semi-persistent CSI reporting, the subset of the plurality of sub-configurations is activated by a medium access control (MAC) control element (CE) received from the BS.

5. The method of claim 1, wherein the first information in each sub-configuration in the subset of the plurality of sub-configurations comprises an antenna port configuration associated with a corresponding list of CSI-RS IDs in the sub-configuration.

6. The method of claim 1, wherein the second information in each sub-configuration in the subset of the plurality of sub-configurations comprises a power offset value associated with a corresponding list of CSI-RS IDs in the sub-configuration.

7. A user equipment (UE) for network energy saving, the UE comprising:

at least one processor; and at least one non-transitory computer-readable medium coupled to at least one processor and storing one or more computer-executable instructions that, when executed by the at least one processor, cause the UE to:

receive, from a base station (BS), a channel state information (CSI) report configuration comprising a plurality of sub-configurations associated with a triggering state, each sub-configuration in the plurality of sub-configurations indicating a list of channel state information (CSI)-reference signal (RS) identifiers (IDs), first information for a spatial domain adaptation, and second information for a power domain adaptation;

receive a plurality of CSI-RSs based on the list of CSI-RS IDs, the first information, and the second information indicated by each sub-configuration in a subset of the plurality of sub-configurations;

generate a CSI report by measuring the plurality of CSI-RSs; and transmit, to the BS, the CSI report, wherein the triggering state is associated with aperiodic CSI reporting or semi-persistent CSI reporting.

8. The UE of claim 7, wherein the CSI report comprises at least one of a channel quality indicator (CQI), a precoding matrix indicator (PMI), a CSI-RS resource indicator (CRI), a synchronization signal/physical broadcast channel block resource indicator (SSBRI), a layer indicator (LI), a rank indicator (RI), and a layer 1 (L1)-reference signal received power (RSRP).

9. The UE of claim 7, wherein, in a case that the triggering state is associated with the aperiodic CSI reporting, the subset of the plurality of sub-configurations is activated by a medium access control (MAC) control element (CE) received from the BS, and indicated by downlink control information (DCI) received from the BS.

10. The UE of claim 7, wherein, in a case that the triggering state is associated with the semi-persistent CSI reporting, the subset of the plurality of sub-configurations is activated by a medium access control (MAC) control element (CE) received from the BS.

11. The UE of claim 7, wherein the first information in each sub-configuration in the subset of the plurality of sub-configurations comprises an antenna port configuration associated with a corresponding list of CSI-RS IDs in the sub-configuration.

12. The UE of claim 7, wherein the second information in each sub-configuration in the subset of the plurality of sub-configurations comprises a power offset value associated with a corresponding list of CSI-RS IDs in the sub-configuration.

13. A base station (BS) for network energy saving, the BS comprising:

at least one processor; and at least one non-transitory computer-readable medium coupled to at least one processor and storing one or more computer-executable instructions that, when executed by the at least one processor, cause the BS to:

transmit, to a user equipment (UE), a channel state information (CSI) report configuration comprising a plurality of sub-configurations associated with a triggering state, each sub-configuration in the plurality of sub-configurations indicating a list of channel state information (CSI)-reference signal (RS) identifiers (IDs), first information for a spatial domain adaptation, and second information for a power domain adaptation;

transmit a plurality of CSI-RSs based on the list of CSI-RS IDs, the first information, and the second information indicated by each sub-configuration in a subset of the plurality of sub-configurations; and receive, from the UE, a CSI report, wherein:

the CSI report is generated by measuring the plurality of CSI-RSs, and the triggering state is associated with aperiodic CSI reporting or semi-persistent CSI reporting.

14. The BS of claim 13, wherein the CSI report comprises at least one of a channel quality indicator (CQI), a precoding matrix indicator (PMI), a CSI-RS resource indicator (CRI), a synchronization signal/physical broadcast channel block resource indicator (SSBRI), a layer indicator (LI), a rank indicator (RI), and a layer 1 (L1)-reference signal received power (RSRP).

15. The BS of claim 13, wherein, in a case that the triggering state is associated with the aperiodic CSI reporting, the subset of the plurality of sub-configurations is activated by a medium access control (MAC) control element (CE) transmitted to the UE, and indicated by downlink control information (DCI) transmitted to the UE.

16. The BS of claim 13, wherein, in a case that the triggering state is associated with the semi-persistent CSI reporting, the subset of the plurality of sub-configurations is activated by a medium access control (MAC) control element (CE) transmitted to the UE.

17. The BS of claim 13, wherein the first information in each sub-configuration in the subset of the plurality of sub-configurations comprises an antenna port configuration associated with a corresponding list of CSI-RS IDs in the sub-configuration.

18. The BS of claim 13, wherein the second information in each sub-configuration in the subset of the plurality of sub-configurations comprises a power offset value associated with a corresponding list of CSI-RS IDs in the sub-configuration.

* * * * *